(12) United States Patent
Janowczyk et al.

(10) Patent No.: US 9,111,179 B2
(45) Date of Patent: Aug. 18, 2015

(54) HIGH-THROUGHPUT BIOMARKER SEGMENTATION UTILIZING HIERARCHICAL NORMALIZED CUTS

(75) Inventors: Andrew Janowczyk, East Meadow, NY (US); Sharat Chandran, Mumbai (IN); Anant Madabhushi, South Plainfield, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 346 days.

(21) Appl. No.: 13/496,627

(22) PCT Filed: Sep. 17, 2010

(86) PCT No.: PCT/US2010/002536
§ 371 (c)(1),
(2), (4) Date: May 17, 2012

(87) PCT Pub. No.: WO2011/034596
PCT Pub. Date: Mar. 24, 2011

(65) Prior Publication Data
US 2012/0219206 A1  Aug. 30, 2012

Related U.S. Application Data

(60) Provisional application No. 61/276,986, filed on Sep. 18, 2009, provisional application No. 61/294,703, filed on Jan. 13, 2010.

(51) Int. Cl.
G06K 9/00  (2006.01)
G06K 9/62  (2006.01)
G06T 7/00  (2006.01)

(52) U.S. Cl.
CPC ............ *G06K 9/6224* (2013.01); *G06T 7/0083* (2013.01); *G06T 7/0093* (2013.01);
(Continued)

(58) Field of Classification Search
CPC ............ G06K 9/00127; G06K 9/0014; G06K 9/4652; G06K 9/6224; G06T 7/0083; G06T 7/0093; G06T 2207/10056; G06T 2207/20016; G06T 2207/30024; G06T 2207/30072

USPC .................. 382/133, 134, 173, 224, 225, 227
See application file for complete search history.

(56) References Cited

U.S. PATENT DOCUMENTS

2003/0224344 A1  12/2003  Shamir et al. ...................... 435/4
2008/0033657 A1  2/2008  Cline et al. ....................... 702/19
(Continued)

FOREIGN PATENT DOCUMENTS

| CN | 101238487 A | 8/2008 | ............... G06T 7/40 |
| CN | 101550441 A | 10/2009 | ............... C12Q 1/68 |
| WO | WO 2011/034596 A1 | 3/2011 | ........... G01N 33/483 |

OTHER PUBLICATIONS

International Search Report of the International Searching Authority mailed Nov. 15, 2010, issued in connection with International Patent Application No. PCT/US10/02536 (2 pages).

(Continued)

*Primary Examiner* — Andrew W Johns
(74) *Attorney, Agent, or Firm* — McCarter & English, LLP

(57) ABSTRACT

A method and apparatus for obtaining segmented images of the stained regions may comprise quantifying the extent of the presence of staining of a biomarker in an original image of a sample, which may comprise selecting a domain swatch of data based upon a user specified domain knowledge; clustering the data within the original image by conducting a frequency weighted mean shift of the data within the original image to convergence, forming a hierarchical plurality of layers each having a different data resolution to form a hierarchical data pyramid; segmenting the plurality of mean shifted data images to determine in each mean shifted data image within the hierarchical data pyramid data not excluded as outside of the swatch; mapping the data not excluded as outside the swatch spatially back to the original image to create a final image; and, storing the final image on a storage medium for further analysis.

21 Claims, 16 Drawing Sheets

(52) U.S. Cl.
CPC ............... *G06T2207/10056* (2013.01); *G06T 2207/20016* (2013.01); *G06T 2207/30024* (2013.01); *G06T 2207/30072* (2013.01)

(56) References Cited

U.S. PATENT DOCUMENTS

| | | | |
|---|---|---|---|
| 2008/0059077 A1 | 3/2008 | Zhou et al. ...................... | 702/19 |
| 2008/0118124 A1 | 5/2008 | Madabhushi et al. ......... | 382/128 |
| 2008/0318800 A1 | 12/2008 | Abbas ............................. | 506/9 |

OTHER PUBLICATIONS

Written Opinion of the International Searching Authority mailed Nov. 15, 2010, issued in connection with International Patent Application No. PCT/US10/02536 (4 pages).
Cheng, "Mean Shift, Mode Seeking, and Clustering," IEEE Transactions on Pattern Analysis and Machine Intelligence, vol. 17, No. 8, Aug. 1995 (10 pages).
Shi, et al., "Normalized Cuts and Image Segmentation," IEEE Transactions on Pattern Analysis and Machine Intelligence, vol. 22, No. 8, Aug. 2000 (18 pages.
Tao, et al., "Color Image Segmentation Based on Mean Shift and Normalized Cuts," IEEE Transactions on Systems, Man, and Cybernetics—Part B: Cybernetics, vol. 37, No. 5, Oct. 2007 (8 pages).
Tu, "Probabilistic Boosting-Tree: Learning Discriminative Models for Classification, Recognition, and Clustering," Proceedings of the Tenth IEEE International Conference on Computer Vision (2005) (8 pages).
Wu, et al., "An Optimal Graph Theoretic Approach to Data Clustering: Theory and Its Application to Image Segmentation," IEEE Transactions on Pattern Analysis and Machine Intelligence, vol. 15. No. 11, Nov. 1993 (13 pages).
Yang, et al., "Improved Fast Gauss Transform and Efficient Kernel Density Estimation," Proceedings of the Ninth IEEE International Conference on Computer Vision -2 Volume Set (2003) (8 pages).
Office Action issued by the State Intellectual Propery Office of the People's Republic of China, along with its English translation, dated Oct. 17, 2013 issued in connection with Chinese Patent Application No. 201080051821.8 (10 pages).
Office Action issued by the State Intellectual Propery Office of the People's Republic of China, along with its English translation, dated Aug. 7, 2014 issued in connection with Chinese Patent Application No. 201080051821.8 (6 pages).
Madabhushi, A., "Digital Pathology Image Analysis: Opportunities and Challenges," Imaging Medicine, 1, pp. 7-10 (2009).
Alexe, G., et al., "Towards Improved Cancer Diagnosis and Prognosis Using Analysis of Gene Expression Data and Computer Aided Imaging," Experimental Biology and Medicine, pp. 860-879 (2009).
Buckanovich, R., et al., "Tumor Vascular Proteins as Biomarkers in Ovarian Cancer," Journal of Clinical Oncology, vol. 25, No. 7, pp. 852-861 (2007).
Vrolijk, H., et al., "Automated Acquisition of Stained Tissue Microarrays for High-Throughput Evaluation of Molecular Targets," Journal of Molecular Diagnostics, vol. 5, No. 3, pp. 160-167 (2003).
Rabinovich, A., et al., "Framework for Parsing, Visualizing and Scoring Tissue Microarray Images," IEEE Transactions on Information Technology in Biomedicine, vol. 10, No. 2, pp. 209-219 (2006).
Zhong, W., et al., "Improved K-Means Clustering Algorithm for Exploring Local Protein Sequence Motifs Representing Common Structural Property," IEEE Transactions on NanoBioscience, vol. 4, No. 3, pp. 255-265 (2005).
Tiwari, P., "Spectral Embedding Based Probabilistic Boosting Tree (ScEPTre): Classifying High Dimensional Heterogeneous Biomedical Data," Medical Image Computing and Computer Assisted Intervention (MICCAI), pp. 844-851 (2009).
Tu, Z., "Probabilistic Boosting-Tree: Learning Discriminative Models for Classification, Recognition, and Clustering," ICCV '05: Proceedings of the Tenth IEEE International Conference on Computer Vision, pp. 1589-1596, Washington, D.C. (2005).
Carneiro, G., et al., "Detection and Measurement of Fetal Anatomies From Ultrasound Images Using a Constrained Probabilistic Boosting Tree," IEEE Transactions on Medical Imaging, vol. 27, No. 9, pp. 1342-1355 (2008).
Shi, J., et al., "Normalized Cuts and Image Segmentation," IEEE Transactions on Pattern Analysis and Machine Intelligence, vol. 22, No. 8, pp. 888-905 (2000).
Cheng, Y., "Mean Shift, Mode Seeking, and Clustering Pattern Analysis and Machine Intelligence," IEEE Transactions on Pattern Analysis and Machine Intelligence, vol. 17, No. 8, pp. 790-799 (1995).
Yang, C., et al., "Improved Fast Gauss Transform and Efficient Kernel Density Estimation," IEEE ICCV, pp. 664-671 (2003).
Dhillon, S., et al., "Weighted Graph Cuts Without Eigenvectors a Multilevel Approach," IEEE Transactions on Pattern Analysis and Machine Intelligence, vol. 29, No. 11, pp. 1944-1957 (2007).
Chandran, S., et al., "Improved Cut-Based Foreground Identification," The Indian Conference on Computer Vision, Graphics and Image Processing (ICVGIPI), pp. 447-454 (2004).
Tao, W., et al., "Color Image Segmentation Based on Mean Shift and Normalized Cuts," IEEE Transactions on Systems, Man, and Cybernetics, Part B: Cybernetics, vol. 37, No. 5, pp. 1382-1389 (2007).
Turing, A., "Computing Machinery and Intelligence," Mind, LIX, pp. 433-460 (1950).
Wu, Z., et al., "An Optimal Graph Theoretic Approach to Data Clustering: Theory and Its Application to Image Segmentation," IEEE Transactions on Pattern Analysis and Machine Intelligence, vol. 15, No. 11, Nov. 1993, pp. 1101-1113 (13 pages).
Wu, J., et al., "Image Quantification of High-Throughput Tissue Microarray," Medical Imaging 2006: Physiology, Function, and Structure from Medical Images, Proc. of SPIE vol. 6143 (2006) (12 pages).
Fukunaga, K., et al., "The Estimation of the Gradient of a Density Function, With Applications in Pattern Recognition," IEEE Transactions on Information Theory, vol. 21, No. 1, Jan. 1975 (9 pages).
Freund, Y., et al., "A Decision-Theoretic Generalization Learning and Application to Boosting," Journal of Computer and System Sciences, 55(1), 119-139 (1997) (21 pages).
Rui, et al., "Creating Tissue Microarrays by Cutting-Edge Matrix Assembly," Expert Rev. Med. Devices, 2(6):673-680 (2005) (8 pages).
Vazirani, V., "Approximation Algorithms," Springer (2004) (387 pages).
Garey, M., et al., "Computers and Intractability: A Guide to the Theory of NP-Completeness," W.H. Freeman & Co., New York, NY (1990) (350 pages).
Parallel and Distributed Computing Handbook, McGraw-Hill, Inc., New York, NY (1996), Part I (614 pages).
Parallel and Distributed Computing Handbook, McGraw-Hill, Inc., New York, NY (1996), Part II (603 pages).

TRADITIONAL MEAN SHIFT (a)

FREQUENCY WEIGHTED MEAN SHIFT (b)

(a)　　　　　　(b)

HIGH-THROUGHPUT BIOMARKER SEGMENTATION UTILIZING HIERARCHICAL NORMALIZED CUTS

RELATED APPLICATIONS

This application is a U.S. National Phase Application under 35 U.S.C. 371 of International Application No. PCT/US2010/002536 filed Sep. 17, 2010, which was published on Mar. 24, 2011 under Publication Number WO 2011/034596 A1, which claims the priority of U.S. Provisional Application Ser. No. 61/294,703, filed on Jan. 13, 2010 and U.S. Provisional Application Serial No. 61/276,986, filed on Sep. 18, 2009. Each of the foregoing applications are incorporated herein by reference in their entirety.

CROSS REFERENCES

This application claims priority to U.S. Provisional Patent Application Nos. 61/294,703, filed on Jan. 13, 2010, entitled HIERARCHICAL NORMALIZED CUTS: HIGH-THROUGHPUT BIOMARKER SEGMENTATION, and 61/276,986, filed on Sep. 18, 2009, entitled SYSTEM AND METHOD FOR AUTOMATED DETECTION AND IDENTIFICATION OF DISEASE AND DISEASE MARKERS FROM BIOLOGICAL IMAGES, the disclosure of each of which is hereby incorporated by reference in its entirety.

STATEMENT OF GOVERNMENT FUNDING

The described subject matter was not made with government support.

FIELD

The disclosed subject matter relates to rapid quantitative analysis of biomarkers in tissue samples, through segmentation, particularly biomarker segmentation providing high throughput analysis utilizing hierarchical normalized cuts.

BACKGROUND

With the advent of whole slide digital scanners, histological data has become amenable to digital and quantitative image analysis, as discussed in Madabhushi, A., Digital pathology image analysis: opportunities and challenges, Imaging in Medicine, 1:7-10, (2009) and Alexe, G. et al., Towards improved cancer diagnosis and prognosis using analysis of gene expression data and computer aided imaging, Experimental Biology and Medicine, 234:860-879 (2009), the disclosures of each of which are hereby incorporated by reference. Additionally, with tissue microarray ("TMA") technology it is possible to simultaneously stain several hundred sections (tissue cylinders) for the presence of various biomarkers. In the digital uncompressed form, these TMA's can be several gigabytes in size with image dimensions of 100,000×100,000 pixels. Some researchers currently are looking to increase the size of cylinders that can be accommodated on a single TMA to over 10,000, as discussed in Rui, H., et al., Creating tissue microarrays by cutting-edge matrix assembly, Expert Rev. Med. Devices, 2(6):673-680 (2005), the disclosure of which is hereby incorporated by reference. Human visual analysis of such large amounts of data is not easily done, requires a highly trained observer, and is also subject to many reasons for inaccurate and/or inconsistent analysis. Therefore, high-throughput, reproducible and accurate computerized image analysis methods are required for quantification of the presence and extent of different biomarkers within TMAs. The present disclosure describes such a system that overcomes these shortcomings of existing analysis techniques.

SUMMARY

The disclosed subject matter relates to a novel algorithm and methodology that enables quantitative analysis of biomarkers in tissue samples. The disclosed subject matter also relates to an algorithm which utilizes an iterative frequency weighted mean shift approach to capture snapshots at various levels of color resolution in the tissue sample as the analysis approaches convergence (defined herein to mean that all points have reached their associated mode based upon the bandwidth parameter).

The disclosed subject matter can obtain accurately segmented images of the stained regions allowing quantification and analysis to more easily take place. The disclosed subject matter also relates to a system to rapidly extract all similar values across many samples by selecting representative points(pixels) from the class of interest in the tissue sample. An objective segmentation can be provided that is user-independent and that can analyze very large numbers of samples, reducing such factors as time, cost of diagnosis and user bias. A hierarchical segmentation approach is disclosed that marries frequency weighted mean shift ("FWMS") and normalized cuts to obtain a hierarchical normalized cut ("HNCut"). Such a HNCut can segment very large images rapidly.

Using HNCut, the disclosed subject matter can discriminate between regions with similar color values, since the disclosed HNCut technique is largely insensitive to choice of parameter value. The parameters for NCuts can be computed automatically and the parameters for the FWMS can be adjusted automatically based on the variance of the output. Initialization of the system disclosed is possible even by an unskilled layperson thus obviating the need for detailed ground truth annotation from an expert for training the system. A disclosed embodiment of the subject matter relates to precisely quantifying a vascular marker on OCa TMAs, creating a quantitative image based metric for OCa prognosis and survival.

A method and apparatus for performing that method also is disclosed, which comprises (a) quantifying the extent of the presence of staining of biomarker in an original image of a sample, which comprises the steps of: (i) selecting a domain swatch of data based upon a user specified domain knowledge of data within the original image; (ii) clustering the data within the original image by conducting a frequency weighted mean shift of the data within the original image to convergence to form a hierarchical plurality of layers of mean shifted data images, each having a different data resolution to form a hierarchical data pyramid; (iii) segmenting the plurality of mean shifted data images to determine in each mean shifted data image within the hierarchical data pyramid data not excluded as outside of the swatch; (iv) mapping the data not excluded as outside the swatch spatially back to the original image to create a final image; and, (v) storing the final image on a storage medium for further analysis. According to some embodiments, the segmenting step of the method and apparatus further comprises utilizing a normalized cuts algorithm. According to some embodiments, the data is selected from the group consisting of image color, intensity and texture. According to some embodiments, the method and apparatus further comprises analyzing the final image with a computerized image analysis machine to interpret pathology content of the original image. According to some embodiments, the pathology content comprises a stained biomarker, such as, one representative of a disease condition, such as, a cancer, such as, ovarian cancer. According to some embodiments, the original image comprises an image of a tissue cylinder from within a tissue micro-array.

A method and apparatus for performing such method is also disclosed, which comprises quantifying the extent of the presence of staining of a biomarker in an original image of a sample, which comprises (i) selecting a domain swatch of data based upon a user specified domain knowledge of data within the original image; clustering the data within the original image by conducting a frequency weighted mean shift of the data within the original image to convergence to form a hierarchical plurality of mean shifted data images having multiple layers of data resolution to form a hierarchical data pyramid; (ii) segmenting the plurality of mean shifted data images utilizing a normalized cuts algorithm to determine in each mean shifted data image within the hierarchical data pyramid data not excluded as outside of the swatch; (iii) mapping the data not excluded as outside the swatch spatially back to the original image to create a final image; and (iv) storing the final image on a storage medium for further analysis. According to some embodiments, the data is selected from the group consisting of image color, intensity and texture. According to some embodiments, the method and apparatus further comprises analyzing the final image with a computerized image analysis machine to interpret pathology content of the original image.

According to some embodiments, the method and apparatus for performing such method also comprises detecting and quantifying the presence and extent of staining on account of a biomarker in an original image taken from a tissue microarray which comprises: (i) selecting a domain swatch; (ii) clustering the original image by conducting a frequency weighted mean shift to convergence on the original image to form a data pyramid with multiple images each having a different level of data resolution; (iii) segmenting each of the multiple images to determine image points not having data values that have been eliminated as being outside the swatch; and (iv) mapping the determined image points and respective data values spatially to the original image. According to some embodiments, the method and apparatus further comprises storing the image points and respective color values on a storage medium for further analysis and analyzing the final image with a computerized image analysis machine to interpret the presence and extent of a biomarker such as, a vascular biomarker, such as a vascular biomarker is related to a disease condition, such as a cancer, such as ovarian cancer.

BRIEF DESCRIPTION OF THE DRAWING

For a more complete understanding of the disclosed subject matter, reference is made to the following detailed description of an exemplary embodiment considered in conjunction with the accompanying drawings, in which:

FIG. 1(a) depicts a zoomed out version of a tissue microarray ("TMA");

FIG. 3(a) depicts an original image with ground truth enclosed in red;

FIG. 3(b) depicts an image at the bottom of the color pyramid during the application of a frequency weighted mean shift ("FWMS") process, with 1.8 million pixels, but with only 44 colors;

FIG. 3(c) depicts an image at the bottom of the color resolution pyramid following application of normalized cuts on the results of the FWMS process of FIG. 3(b) (hierarchical normalized cuts "HNCuts");

FIG. 3d depicts results of the final segmentation illustrated in block 4 of FIG. 2, with 73,773 pixels and 1572 colors, the result obtained by mapping colors not eliminated by HNCut spatially onto the original image of FIG. 3a.

FIGS. 7(a) and 7(b) depict original input, with the annotated ground truth in red, presented on the top;

FIGS. 7(c) and 7(d) illustrate results from applying HNCuts according to aspects of an embodiment of the disclosed subject matter;

FIGS. 7(e) and 7(f) depict PBT results;

FIGS. 7(g) and 7(h) depict k-means results;

FIG. 13(b) depicts a zoomed-in section of the stain of FIG. 13(a);

FIG. 13(c) depicts its associated near optimal segmentation obtained according to processes implementing aspects of an embodiment of the disclosed subject matter.

DETAILED DESCRIPTION

The subject matter disclosed in this patent application relates to an algorithm and methodology that can enable rapid, quantitative analysis of biomarkers in tissue samples. The disclosed method and algorithm and apparatus implementing such method and algorithm can utilize an iterative frequency weighted mean shift approach to capture snapshots at various levels of color resolution in the tissue sample as it approaches convergence (defined here to mean all points have reached their associated mode based on the bandwidth parameter).

The layers then can be subjected to a normalized cut, e.g., guided by a small swatch of user specified domain knowledge, and then can be mapped to a final segmented result. The procedure can be performed in less than one minute to obtain accurately segmented images of the stained regions allowing quantification and analysis to thereafter easily take place. By selecting representative points (pixels) from the class of interest in the tissue sample, the system can rapidly extract all similar values across many samples. The overall approach also can provide an objective segmentation that is user-independent and can analyze a very large numbers of samples, reducing time, cost of diagnosis and user bias. In one exemplary embodiment of the disclosed subject matter, as described in detail below, the biomarkers can be specific tumor vascular biomarkers (TVMs), identifiable on ovarian cancer ("Oca") TMAs.

Many women are diagnosed with cancer each year, including ovarian cancer ("Oca") and may thousand dies each year from the disease. The 5-year survival rates of these women are highly correlated to early detection. Recent work suggests that biomarkers, e.g., specific tumor vascular biomarkers (TVMs), such as may be identifiable on OCa TMAs, could have prognostic significance, which would enable not only predicting the aggressiveness of the disease, but could also help in tailoring a personalized treatment regime for the patient. Buckanovich, R., et al., Tumor Vascular Proteins As Biomarkers in Ovarian Cancer, Journal Of Clinical Oncology, :852-861, (2007) ("Buckanovich").

Biomarkers typically are discovered by staining, e.g., explicitly for TVMs of interest on representative samples, such as OCa TMAs. Precise identification of the extent and intensity of the stain could provide a quantitative and reproducible prognostic metric that could help predict risk of disease recurrence and patient survival.

Figure 1:
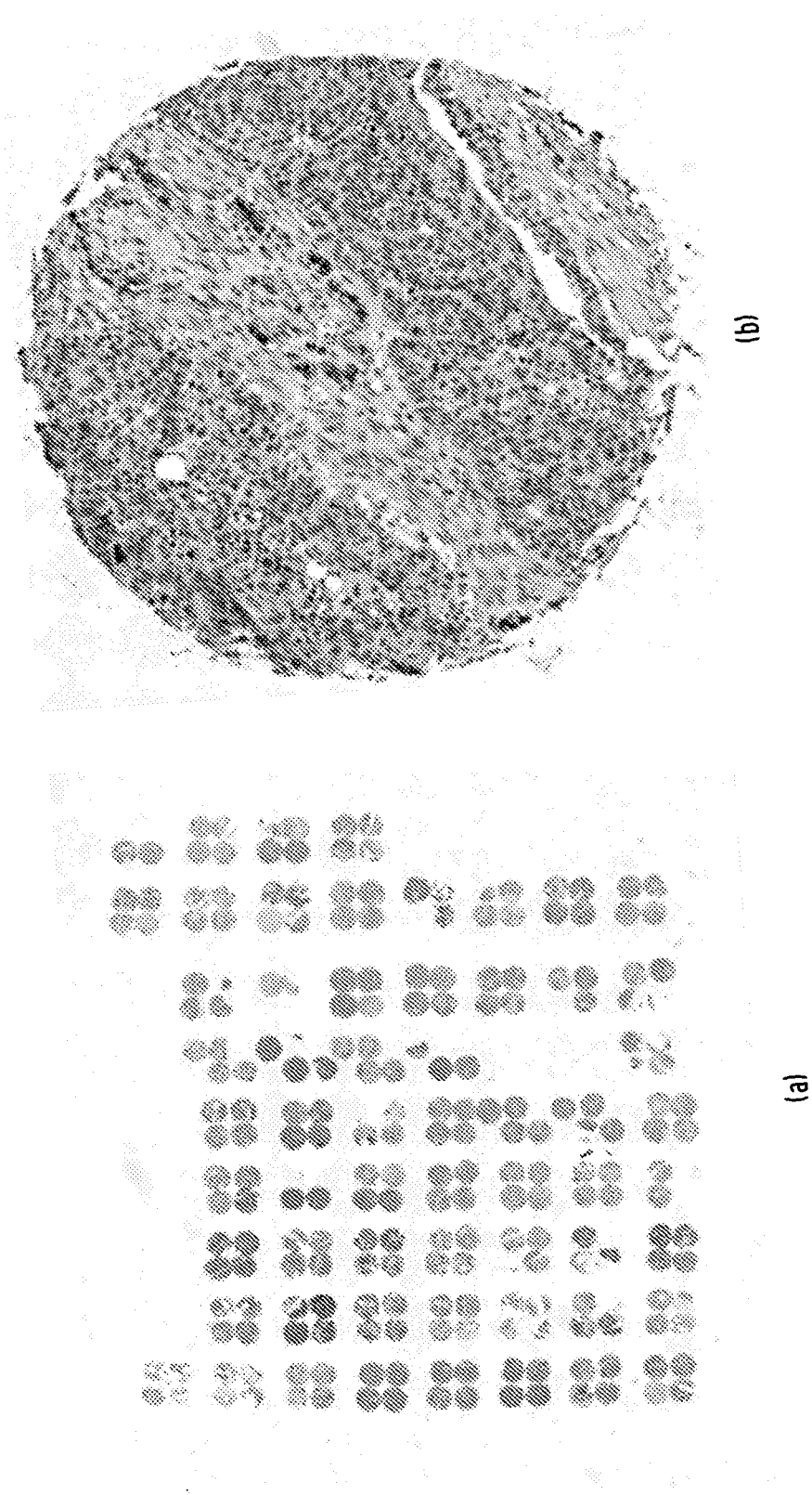
FIG. 1 (b) depicts a representative magnified single extracted tissue cylinder drawn from FIG. 1 (a)

Turning now to FIG. 1 there is shown an image of stained cells in a region of interest represented by a reactive chemically stained dark brown region, corresponding to a TVM Endothelial-specific molecule-1 ("ESM-1"), as discussed in the Buckanovich reference. While the extent and intensity of such a region stained with ESM-1 may have prognostic significance, it is currently impractical in terms of both time and effort for an expert pathologist to perform this segmentation manually.

FIG. 1(a) depicts a zoomed out version of a tissue microarray ("TMA") 20 and FIG. 1(b) depicts a representative magnified single extracted tissue cylinder drawn from FIG. 1(a). A typical TMA can contain over 500 individual cylinders, making the biomarker detection via traditional image analysis algorithms a challenge. The cylinder can contain large, perhaps disconnected portions of "brown" stain matter which can indicate the presence of a tested gene, and "light" brown artifacts where the stain steeped into portions between cells. Although both the artifact and the stained region may be considered as brown, the gene indicator is indicated by the specific way clumps of brown appear in the stain.

Most previous computerized image analysis algorithms for TMAs have involved thresholding based schemes, as discussed in Vrolijk, H., et al., Automated acquisition of stained tissue microarrays for high-throughput evaluation of molecular targets, Journal Of Molecular Diagnostics, 5(3), (2003) ("Vrolijk"); Wu, J., et al., Image quantification of high-throughput tissue microarray, In Manduca, A. et al., editors, SPIE Medical Imaging, pages 509-520, (2006); and Rabinovich, A., et al., Framework for parsing, visualizing and scoring tissue microarray images, IEEE Transactions on Information Technology in Biomedicine, 10(2):209-219, (2006). These methods are known to be highly sensitive to even slight changes in color and illumination. Clustering based approaches, including k-means, discussed in the Vrolijk reference, also have been investigated for the analysis of TMAs. However, k-means is a non-deterministic algorithm and is highly sensitive to the initial choice of cluster centers, as noted in Zhong, W., et al., Improved K-means clustering algorithm for exploring local protein sequence motifs representing common structural property, NanoBioscience, IEEE Transactions on, 4(3):255-265, (2005).

While supervised learning methods such as Probabilistic Boosting Trees (PBT), as discussed in Tiwari. P., Spectral embedding based probabilistic boosting tree (ScEPTre): classifying high dimensional heterogeneous biomedical data, Medical Image Computing and Computer Assisted Intervention (MICCAI), 1:844-851 (2009) and ("Tu"), Z., Probabilistic boosting-tree: learning discriminative models for classification, recognition, and clustering, ICCV '05: Proceedings of the Tenth IEEE International Conference on Computer Vision, pages 1589-1596, Washington, D.C., USA, (2005), IEEE Computer Society, have become popular for image classification and segmentation, these methods are constrained by the difficulty in obtaining ground truth segmentations from experts for classifier training of the object of interest, as noted in Carneiro, G., et al., Detection and measurement of fetal anatomies from ultrasound images using a constrained probabilistic boosting tree, IEEE Trans. Med. Imaging, 27(9):1342-1355 (2008) ("Carneiro"). Manual annotation of the data, apart from being time-consuming and laborious, also can be expensive if only a medical practitioner is capable of providing accurate annotations. Additionally, if the target of interest changes, considerable effort might be required to generate new annotations and re-train the classifier.

In one embodiment, the disclosed subject matter relates to a method and system of detecting and quantifying the presence and extent of staining within a sample, e.g., due to a vascular biomarker, such as for ovarian cancer (OCa), e.g., in tissue microarrays ("TMAs") using a flexible, robust, accurate and high-throughput unsupervised segmentation algorithm, termed by applicants a Hierarchical Normalized Cuts algorithm ("HNCuts").

The high-throughput aspect of HNCut is derived from the use of a hierarchically represented data structure, wherein the disclosed subject matter marries two image segmentation algorithms—a frequency weighted mean shift (FWMS) algorithm and a normalized cuts algorithm (NCuts). HNCuts rapidly traverses a hierarchical pyramid, generated from the input image being mean shifted to create various color resolutions, enabling the rapid analysis of large images (e.g. a 1,500×1,500 sized images in under 6 seconds on a standard 2.8 Ghz desktop PC). HNCut also can be easily generalized to other problem domains and only requires specification of a few representative pixels (a swatch) from the object of interest in order to segment the target class.

The disclosed subject matter can be evaluated in the specific context of an application for segmenting a vascular marker across 130 samples of, e.g., OCa tissue microarrays, such as have been obtained from multiple patients. The HNCuts algorithm has been found by applicants to have a detection sensitivity and positive predictive value (PPV) of 82% and 70% when evaluated with respect to a pathologist annotated ground truth. By comparison, a popular supervised classifier (Probabilistic Boosting Trees) was only able to achieve a sensitivity and PPV of 85% and 53% respectively, with an additional computation time of 62% compared to aspects of HNCuts according to the disclosed subject matter.

The disclosed subject matter, therefore, relates to a fast, flexible and broadly applicable hierarchical unsupervised segmentation method (HNCuts) for automated identification of the target class. In an embodiment of the disclosed subject matter, the specific application of HNCuts to a problem of automated quantification of a stain extent, such as one associated with a vascular marker, e.g., for OCa on TMAs is described. The disclosed subject matter can provide a methodological description of HNCut. Qualitative and quantitative evaluation results in segmenting a TVM according to the disclosed subject matter are described.

The disclosed subject matter marries a powerful unsupervised clustering technique (mean shift, as discussed in Fukunaga, K., et al., The estimation of the gradient of a density function, with applications in pattern recognition, Information Theory, IEEE Transactions on, 21(1):32—40 (1975) ("Fukunaga"), with an equally powerful graph partitioning scheme (normalized cuts, as discussed in Shi, J., et al., Normalized cuts and image segmentation, IEEE Trans. PAMI, 22(8):888-905 (2000) ("Shi"). The authors therein discuss an approach for solving the perceptual grouping problem in vision with respect to an image, which aims at extracting a global impression of an image by treating an image segmentation as a graph partitioning problem. The normalized cut, used for segmenting a graph by a normalized cut criterion is said to measure both the total dissimilarity between the different groups of pixels as well as the total similarity within the groups of pixels. By performing clustering and partitioning in the color space (as opposed to pixel-level classification) the HNCuts algorithm according to the disclosed subject matter, can be highly efficient and accurate.

The HNCuts algorithm only requires specifying a few representative pixels from the target class and, unlike more traditional supervised classification algorithms, does not require more detailed target object annotation. More importantly, the HNCuts algorithm is more flexible compared to supervised schemes in its ability to segment different object classes. The combination of both the high-throughput efficiency and flexibility of the HNCuts method and algorithm and apparatus to implement such method and algorithm, according to the disclosed subject matter makes it ideally suited to quantifying the expression of biomarkers on TMAs.

The HNCuts algorithm of the present application, according to aspects of the disclosed subject matter, employs a variant of the popular mean-shift clustering technique, called frequency weighted mean shift ("FWMS"). The mean shift (MS) algorithm was originally presented in the Fukunaga reference and revised in the Carneiro reference as an unsupervised technique aimed at mode discovery for use in place of k-means. MS attempts to overcome the weakness of popular clustering schemes by attempting to identify the cluster mean within a pre-defined bandwidth. By using a steepest gradient approach, a fast convergence to the set of true means of the statistical data can be found, as discussed in Cheng, Y., Mean shift, mode seeking, and clustering. Pattern Analysis and Machine Intelligence, IEEE Transactions on, 17(8):790-799 (1995).

An improved fast Gauss transform (IFGT) implementation of the MS algorithm, as discussed in Yang, C., et al., Improved fast gauss transform and efficient kernel density estimation, IEEE ICCV, 1:664-671 (2003) ("Yang"), allows computation times for large images to become reasonable. For purposes of the present application, there is no difference between IFGT-MS and MS, other than speed of execution. The Normalized Cuts (NCuts) algorithm descends from a series of graph cutting techniques ranging from max cut to min cut, as discussed in [13] Vazirani, V., Approximation Algorithms, Springer (2004); Garey, M., et al., Computers and Intractability; A Guide to the Theory of NP-Completeness, W. H. Freeman & Co., New York, N.Y., USA (1990); and Wu, Z., et al. An optimal graph theoretic approach to data clustering: theory and its application to image segmentation, Pattern Analysis and Machine Intelligence, IEEE Transactions on, 15(11): 1101-1113 (1993). It is a popular scheme in spite of its main drawbacks: (1) the large number of calculations needed for determining the affinity matrix and (2) the time consuming eigenvalue computations. For large images, the computation and overhead of these, however, border on the infeasible, as discussed in Shi. Consequently, a significant amount of research has focused on avoiding such direct calculations, as discussed in Dhillon, S., et al., Weighted Graph Cuts without Eigenvectors A Multilevel Approach, IEEE Trans. PAMI, 29(11):1944-1957 (2007), and Chandran, S., et al., Improved Cut-Based Foreground Identification, The Indian Conference on Computer Vision, Graphics and Image Processing (ICV-GIP), pages 447-454 (2004).

To overcome the computational issues associated with NCuts, an approach of combining both the MS and NCut algorithms was presented in Tao, W., et al., Color Image Segmentation Based on Mean Shift and Normalized Cuts, IEEE Transactions on Systems, Man, and Cybernetics, Part B, 37(5):1382-1389 (2007) ("Tao").

Tao Clustered the image by running the MS algorithm to convergence produced class assignments for the pixels. By taking the average intensity value of the regions obtained via the MS clustering step and using them as the vertices in the NCuts algorithm, a significant speed improvement was obtained.

Figure 2:
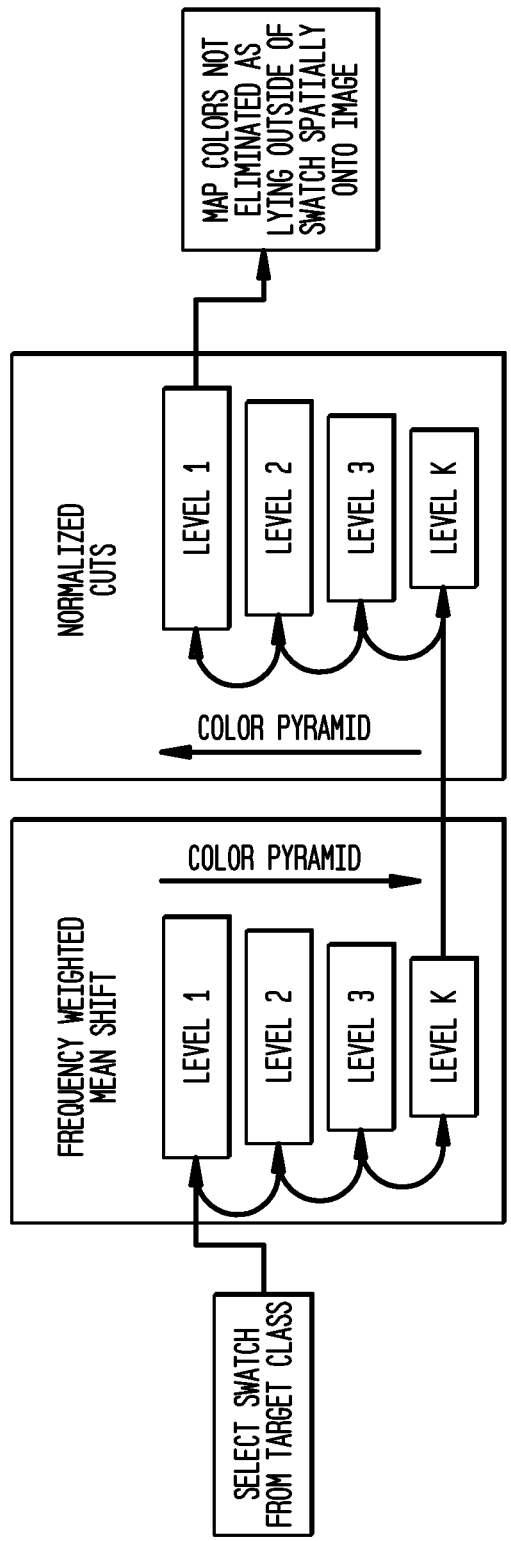
FIG. 2 depicts a high level flow chart of an HNCut process according to aspects of an embodiment of the disclosed subject matter.

FIG. 2 depicts a high level flow chart of the HNCut process according to aspects of an embodiment of the disclosed subject matter. In FIG. 2, proceeding left to right, the user can select a domain swatch, which can then be followed by FWMS of the image, e.g., to convergence forming multiple levels of color resolution (a color pyramid), and saving the states along the required way. Then the user can apply NCuts at the color resolution levels generated and saved in the color pyramid. Following the application of NCut on the color resolution levels pyramid, which can proceed from the lowest to the highest color resolution, color values that have not been eliminated as outside the swatch can be mapped back to the original image pixels, thereby obtaining a final segmentation.

The proposed HNCut is similar to the method discussed in the Tao reference, however, there are at least three important differences, as is illustrated in FIG. 2. First, the presently disclosed subject matter manually identifies the target class based from representative pixel samples (referred to as a swatch) selected from the target class by a user. This swatch, which can be changed based on the desired target class or domain, lends HNCut significant flexibility and ease of use. Second, the MS algorithm is modified, e.g., to form a frequency weighted MS (FWMS) that can accomplish the same task as MS but does it significantly faster. FWMS can exploit the fact that as each iteration of MS completes, more points converge. According to one aspect of the disclosed subject matter, the convergence through the use of a FWMS scheme allows for clustering to be performed 15 times faster than the traditional MS algorithm discussed in Tao. Finally, the disclosed subject matter can use the iterations from FWMS to form a hierarchical data structure (represented by the resolution levels in the color pyramid). Using this color pyramid, according to aspects of an embodiment of the disclosed subject matter, can drastically reduce the large segmentation problem in the color space to a set of much smaller graph partitioning problems upon which Ncuts has to operate, allowing for solving far more efficiently.

Figure 3:
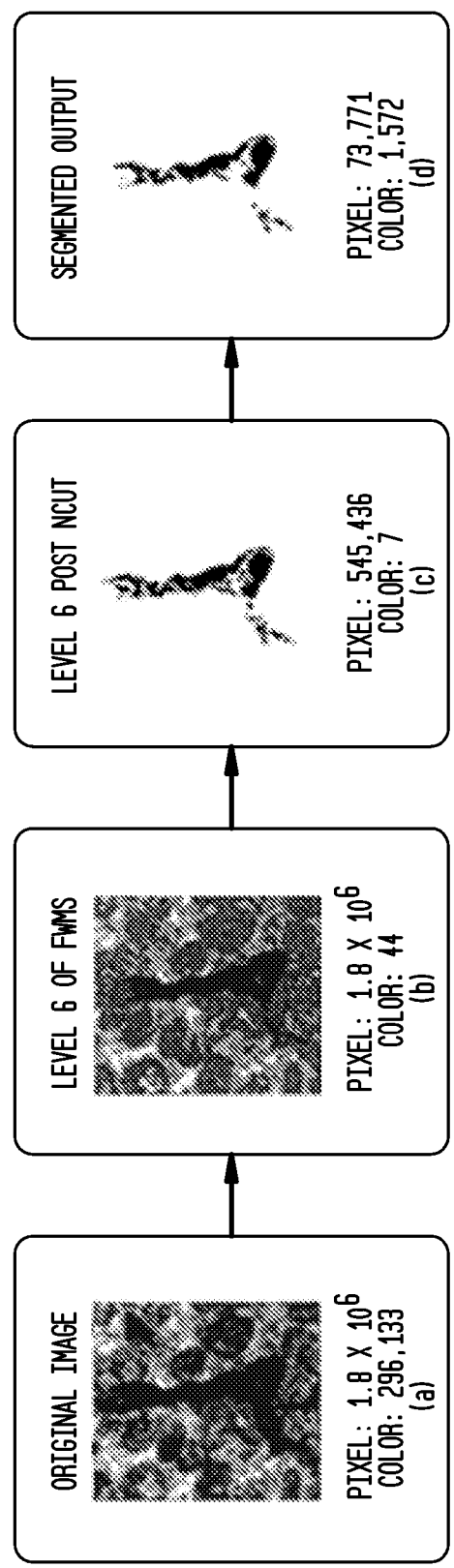

FIGS. 3a-3d shows a typical cropped image from a dataset upon which HNCuts according to the disclosed subject matter can be performed. The numbers shown in the boxes in FIG. 3 represent a typical output of a single 1,500×1,500 cylinder from a TMA, as illustrated in FIG. 1. FIG. 3(a) depicts an Original image, e.g., with 1.8 million pixels and 296,133 colors. FIG. 3b depicts an image at the bottom of the color resolution pyramid during the application of a frequency weighted mean shift FWMS ("FWMS") process, with 1.8 million pixels, but with only 44 colors. FIG. 3c depicts an image at the bottom of the color resolution pyramid following application of normalized cuts on the results of the FWMS process of FIG. 3(b) (hierarchical normalized cuts "HNCuts"). This image is with 545,436 pixels and 7 colors. FIG. 3d depicts results of the final segmentation illustrated in block 4 of FIG. 2, with 73,773 pixels and 1572 colors, the result obtained by mapping colors not eliminated by HNCut spatially onto the original image of FIG. 3a.

Between FIGS. 3a and 3b, a significant reduction in color resolution occurs, which, e.g., can allow normalized cuts to be performed on an image with several orders of magnitude fewer colors compared to the original image in FIG. 3(a). NCuts then can be applied at progressively higher color resolutions, while at each pyramid level colors not deemed to be part of the swatch are eliminated. The colors retained at the highest resolution then can be spatially mapped onto the corresponding pixels to yield the final segmentation.

According to aspects of the disclosed subject matter as used herein, Hierarchical Normalized Cuts (HNCuts) can be described as follows. Notation used can constitute an image scene, which can be defined as c=(C, f) where C is a 2D Cartesian grid of N pixels, c∈C, where c=(x, y), f is a color intensity function, where $f \in R^3$ The disclosed subject matter can define as $F_1$, the vector of colors associated with all pixels c∈C, at the full color resolution (top of the color pyramid). The elements of $F_1$, namely f, can be derived such that for pixel $c_i$, $f_{1,i}=f(c_i)$. A list of commonly used notation and symbols in describing the presently disclosed subject matter is found in Table 1.

TABLE 1

| Symbol | Description | Symbol | Description |
| --- | --- | --- | --- |
| C | 2D Image Scene | c | 2D Cartesian grid of pixels, c = (x, y) |
| G | Gaussian function with bandwidth of size $\sigma_{MS}$ | $S_1$ | User selected swatch |
| k | Levels in color pyramid k ∈ {1, . . . , K} | N | Number of pixels, |C| |

TABLE 1-continued

| Symbol | Description | Symbol | Description |
| --- | --- | --- | --- |
| $F_k$ | Color vector at level k | G | Connected graph G of edges E and vertices V |
| $\hat{F}_k$ | $F_k$ with all duplicate values removed | $w_k$ | Frequency counts of $\hat{F}_k$ in $F_k$ |
| $M_k$ | $|\hat{F}_k|$ | Ψ | Symmetric matrix comprised of $\psi(c_i, c_j)$ |
| $\psi(c_i, c_j)$ | Affinity measure between $c_i, c_j$ | D | Diagonal matrix with $D(i, i) = \Sigma_j \psi(c_i, c_j)$ |

The disclosed subject matter also can integrate domain knowledge to guide Normalized Cuts. A swatch (color template) can be selected which reflects the attributes of the object of interest in the scene. A user via manual selection can define a color swatch $S_1=\{f_{1,\alpha_\tau} | \alpha_\tau, \tau \in \{1, \ldots, N\}\}$. It can be seen that $S_1$ can be easily obtained, e.g., by annotating (manually) a few pixels from the object of interest on a representative image and may be easily changed, as appropriate, based on the application. As described in further detail below, in an example of a possible embodiment of the disclosed subject matter, $S_1$ is only used to identify which color partition (A or B from Eq. 10, below) to retain during NCuts. Further, by way of example, since $S_1$ is a reference to a subset of the color values in the original image, it can undergo all of the MS and NCut operations presented below. $S_1$ in such an example is a swatch originally defined by the user at the full resolution, k=1.

According to aspects of one embodiment of the disclosed subject matter the frequency weighted mean shift ("FWMS") for reducing the number of colors upon which to apply the segmenting algorithm, such as the Ncuts algorithm, the clustering algorithm, such as a mean shift algorithm, can be used to detect modes in data using a density gradient estimation. By, e.g., solving for when the density gradient is zero and the Hessian is negative semi-definite, local maxima can be identified. A more detailed explanation of the clustering mean shift algorithm may be found in reference Cheng, Y. Mean shift, mode seeking, and clustering, Pattern Analysis and Machine Intelligence, IEEE Transactions on 17 (8), 790-799 (1995) ("Cheng").

The disclosed subject matter begins with the Cheng fixed point iteration update $\forall j \in \{1, \ldots, N\}$ in MS as $$f_{k+1,j} \leftarrow \frac{\sum_{i=1}^{N} f_{k,i} G(f_{k,j} - f_{k,i})}{\sum_{i=1}^{N} G(f_{k,j} - f_{k,i})}, \quad (1)$$

where G is a Gaussian function, with a bandwidth parameter $\sigma_{MS}$, which is used to compute the kernel density estimate at data point $c_j$, $$G(f_{k,j} - f_{k,i}) = \exp\left(-\frac{\|f_{k,j} - \hat{f}_{k,i}\|_2}{\sigma_{MS}}\right),$$

with $\|\ldots\|_2$ representing the L2 norm. $k \in \{1, \ldots, K\}$ represents various levels of color resolution produced at each iteration. The overall computation time for Equation 1 is $O(N^2)$. By employing the Improved Fast Gauss transform ("IFGT"), as discussed in Yang, C., et al., Improved fast gauss transform and efficient kernel density estimation, IEEE ICCV, 1, 664-671 (2003) ("Yang"), the computation complexity is reduced to O(N) with minimal precision loss.

It becomes possible to exploit the fact that after each iteration of the MS many of the data points, e.g. color values, converge. If we consider what that convergence means mathematically, essentially two points $c_{\beta_1}$, $c_{\beta_2}$, where $\beta_1$, $\beta_2$, $\in\{1, \ldots, N\}$ meet the requirement $|f_{k,\beta_1} - \theta_{k,\beta_2}| \leq \epsilon$, where $\epsilon$ is a pre-defined tolerance value. The numerator of Eq. 1 which is $$f_{k,\beta_1} G(f_{k,j} - f_{k,\beta_1}) + f_{k,\beta_2} G(f_{k,j} - f_{k,\beta_2}) + \sum_{i=1, i \neq \beta_1, \beta_2}^{N} f_{k,i} G(f_{k,j} - f_{k,i}), \quad (2)$$

can be rewritten in the form $$2 f_{k,\beta_1} G(f_{k,j} - f_{k,\beta_1}) + \sum_{i=1 mi \neq \beta_1, \beta_2}^{N} f_{k,i} G(f_{k,j} - f_{k,i}), \quad (3)$$

thereby avoiding the explicit calculation of $G(f_{k,j} - f_{k,\beta_2})$ where j, $\beta_1$, $\beta_2 \in \{1, \ldots, N\}$, $k \in \{1, \ldots K\}$. This results in one less computation for the Gaussian, which is by far the most expensive operation in the entire MS clustering process. As another example consider the colors $\beta_1$, $\beta_2$, $\beta_3 \in \{1, \ldots, N\}$ converging to one color value and $\gamma_1$, $\gamma_2 \in \{1, \ldots, N\}$ converging to another value, the resulting formulation $$f_{k,\beta_1} G(f_{k,j} - f_{k,\beta_1}) + f_{k,\beta_2} G(f_{k,j} - f_{k,\beta_2}) + \quad (4)$$
$$f_{k,\beta_3} G(f_{k,j} - f_{k,\beta_3}) + f_{k,\gamma_1} G(f_{k,j} - f_{k,\gamma_1}) +$$
$$f_{k,\gamma_2} G(f_{k,j} - f_{k,\gamma_2}) + \sum_{i=1, i \neq \beta_1, \beta_2, \beta_3, \gamma_1, \gamma_2}^{N} f_{k,i} G(f_{k,j} - f_{k,i}),$$

may be succinctly expressed as:

$$3 f_{k,\beta_1} G(f_{k,j} - f_{k,\beta_1}) + 2 f_{k,\gamma_1} G(f_{k,j} - f_{k,\gamma_1}) + \quad (5)$$
$$\sum_{i=1, i \neq \beta_1, \beta_2, \beta_3, \gamma_1, \gamma_2}^{N} f_{k,j} G(f_{k,j} - f_{k,i}),$$

assuming that $\beta_1$, $\beta_2$, $\beta_3$ and $\gamma_1$, $\gamma_2$ satisfy the convergence criterion. The formulation in Equation 5 results in a significant computational efficiency improvement. In the example above, five Gaussian computations can be replaced by two, followed by two multiplications. The computational savings apply to the denominator as well as it follows the same reduction.

As a result, one can rewrite the update presented in Equation 1 as a multi step update. Initially, one can determine the unique values in $F_k$ under the constraint that any color values $|f_{k,i} - f_{k,j}| \leq \epsilon$ are considered equivalent. Thus beginning with $F_k = \{f_{k,1}, f_{k,2}, \ldots, f_{k,|F_k|}\}$ we can construct the vector $\hat{F}_k$ where $\hat{F}_k \subset F_k$ and $\hat{F}_k$ is a set of only unique values in $F_k$, where $$\hat{F}_k = \{f_{k,\zeta_1}, f_{k,\zeta_2}, \ldots, f_{k,\zeta_{M_k}}\}$$

such that $\zeta_1, \zeta_2, \ldots, \zeta_{M_k} \in \{1, \ldots, |F_k|\}$. In order to construct the weight vector $w_k = \{w_{k,1}, \ldots, w_{k,M_k}\}$ associated with $F_k$ one can compute $$w_{k,j} = \sum_{i=1, f_{k,j} = \hat{f}_{k,j}}^{|F_k|} w_{k-1,i}, \quad (6)$$

where $j \in \{1, \ldots, M_k\}$. When k=1, one can define $w_0$ as a vector of length N, filled with ones, representing that each color value has equal weighting. Now, the number of points in the system that have converged to some intensity (color) value $\hat{f}_{k,j}$ is represented by $w_{k,j}$. It is important to note the following definition of $M_k$ where $|w_k| = |\hat{F}_k| = |F_{k+1}| M_k$, and $$\sum_{i=1}^{M_l} w_{k,i} = N, \quad (8)$$

which leads to the update of Equation 1:

$$f_{k+1,j} \leftarrow \frac{\sum_{i=1}^{M_k} w_{k,i} \hat{f}_{k,i} G(\hat{f}_{k,j} - \hat{f}_{k,j})}{\sum_{i=1}^{M_k} w_{k,i} G(\hat{f}_{k,j} - \hat{f}_{k,i})}, \quad (9)$$

for $j \in \{1, \ldots, M_k\}$

Figure 4:
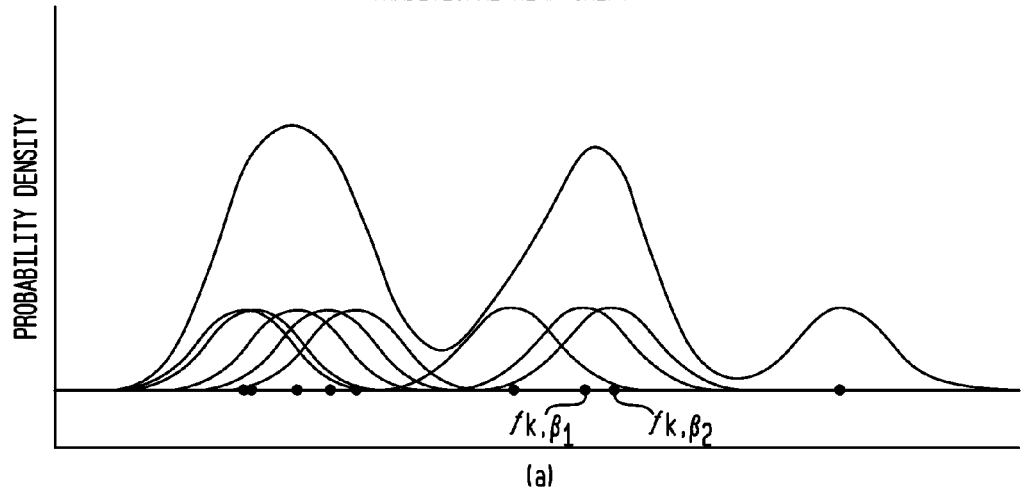
FIG. 4 depicts a visual representation of probability density functions illustrating the difference between (a) traditional MS and (b) frequency weighted MS.
Figure 4:
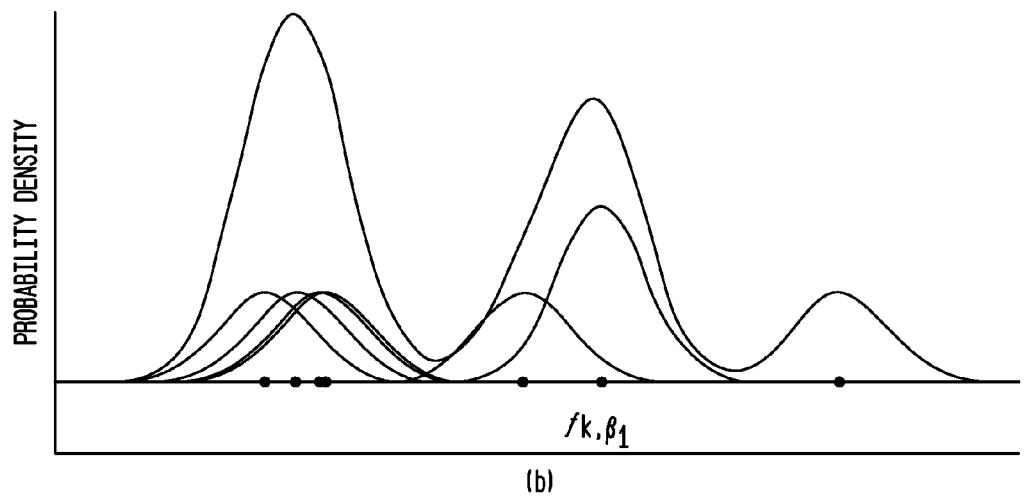

FIGS. 4(a) and 4(b) depict a visual representation of the probability density functions illustrating the difference between the traditional MS depicted in FIG. 4(a) and the frequency weighted MS depicted in FIG. 4(b). The red circles on the x-axis 100 are the given values in a 1 dimensional system, the blue arcs 102 above them represent their associated Gaussian contributions, while the red line 103 above represents the summation of all of the contributions, i.e. the probability density function. In FIG. 4(b), when points $f_{\beta_1}$ and $f_{\beta_2}$ converge, and $f_{\beta_2}$ is removed from the system, and its contribution is moved into $f_{\beta_1}$ as a multiplication, avoiding an expensive step in the computation of the Gaussian.

An illustration of the steps described in Equations 3-9 is also presented in FIGS. 4(a) and 4(b), where the images depict a standard probability density function 120 in FIG. 4(a) computed from the Gaussian contributions 122 from the 1 dimensional data points 100. From FIG. 4(a) it can be seen that colors $f_{\beta_1}$ and $f_{\beta_2}$ will converge in the next iteration of the MS. One can exploit the fact that once $f_{\beta_1}$ and $f_{\beta_2}$ converge, it becomes possible to factor out $f_{\beta_2}$ from the system, and move its contribution into $f_{\beta_1}$, without altering the distribution as can be seen in FIG. 4(b).

Such an approach is referred to by applicants as a Frequency Weighted Mean Shift ("FWMS"). The completed FVVMS produces a pyramidal scene representation $C_k = (C, F_k)$, where $k \in \{1, \ldots, K\}$ represents K levels of color pyramid. Note that $M_1 \geq M_2 \geq \ldots \geq M_K$, indicating level 1 has the most colors and $M_K$ the least. In other words, FWMS results in a series of scenes $C_k$, all mutually aligned, but with a fewer number of colors in $\{C_K, C_{K-1}, \ldots\}$ compared to $\{C_1, C_2, \ldots\}$. It is the fewer colors at $\{C_K, C_K - 1, \ldots\}$ that enable a segmenting algorithm such as an NCut algorithm to be tractable, however, $\{C_1, C_2, \ldots\}$ are needed for refined segmentation.

An example of the algorithm for FWMS is shown below. This process as illustrated in FIG. 3 is shown as the sequence of steps going from (a) to (b). It may be seen that the overall color resolution is significantly reduced as the algorithm proceeds from the level 1 to level K. In this example, the original image containing about 300,000 unique color values was reduced to 44 unique values. This significantly smaller set of values makes the NCut step tractable.

---
Algorithm 1 Frequency Weighted Mean Shift to Generate Color Pyramid
---
Input: $F_1$ of $C_1$
Output: $\hat{F}_1, \hat{F}_2, \ldots, \hat{F}_K$
1: k = 1
2: while Not Converged do
3:  Compute the unique values of $F_k$ and store them in $\hat{F}_k$
4:  Compute the frequency of appearance of the colors in $\hat{F}_k$ as they appear in $F_k$ using Equation 6 and store them in $w_k$
5:  Generate $F_{k+1}$ using Eq 9
6:  k = k + 1
7: end while
8: return $\hat{F}_1, \hat{F}_2, \ldots, \hat{F}_K$
---

Normalized Cuts on top of the Frequency Weighted Mean Shift reduced color space provides a graph partitioning method, used to separate data into disjoint sets. For purposes of the present application, the hierarchical pyramid created by FWMS at various levels of color resolution (($\hat{F}_1, \hat{F}_2, \ldots, \hat{F}_K$) serves as the initial input to the NCuts algorithm. NCuts takes a connected graph G=(E,V)), with vertices (V) and edges (E) and partitions the vertices into disjoint groups. By setting V to the set of color values $\hat{F}_K$, and having the edges represent the similarly (or affinity) between the color values, one can separate the vertices into groups of similar color values. A cut can be defined as the process by which the removal of edges leads to two disjointed partitions. The normalized cut between two disjoint subsets $A = \{\hat{f}_{k,\pi_1}, \hat{f}_{k,\pi_2}, \ldots, \hat{f}_{k,\pi_t}\}$ where $\pi_1, \pi_2, \ldots, \pi_t \in \{1, \ldots, M_k\}$ and $B = \{\hat{f}_{k,\phi_1}, \hat{f}_{k,\phi_2}, \ldots, \hat{f}_{k,\phi_p}\}$ where $\phi_1, \phi_2, \ldots, \phi_p \in \{1, \ldots, M_k\}$ that make up V is computed using:

$$NCut(A, B) = \frac{cut(A, B)}{assoc(A, V)} + \frac{cut(A, B)}{assoc(B, V)}, \quad (10)$$

$$cut(A, B) = \sum_{\hat{f}_{k,r} \in A, \hat{f}_{k,t} \in B} \psi(\hat{f}_{k,r}, \hat{f}_{k,t}), \quad (11)$$

$$assoc(A, V) = \sum_{\hat{f}_{k,r} \in A, \hat{f}_{k,h} \in V} \psi(\hat{f}_{k,r}, \hat{f}_{k,h}), \quad (12)$$

where $h, r, t \in \{1, \ldots, M_k\}$. Note $A \cup B = \hat{F}_k = V$, $A \cap B = \emptyset$. The function $\psi(\hat{f}_{k,i}, \hat{f}_{k,j})$ is used to compute an affinity measure between $\hat{f}_{k,i}$ and $\hat{f}_{k,j}$.

NCuts yields partitions A and B such that the variance of colors in A and B are minimized and the difference in average intensity of colors between A and B is maximized. After the first cut, additional cuts can be made on either of the subsets (A or B), producing another binary sub-partition. This entire process can be recast and solved as a generalized eigenvalue system, as discussed in the Shi reference. For the purposes of the present application it is sufficient that the optimal partition becomes the generalized eigenvalue system solved for ξ described by $$(D - \psi)\xi = \delta D\epsilon. \quad (13)$$

with $D \in R^{M_k \times M_k}$ as a diagonal matrix with $D(i,i) = \Sigma_j \psi(\hat{f}_{k,i}, \hat{f}_{k,j})$, $j \in \{1, \ldots, M_k\}$ on its diagonal and $\Psi \in R^{M_k \times M_k}$ as a symmetrical matrix with $\Psi(i,j) = \psi(\hat{f}_{k,i}, \hat{f}_{k,j})$ for $i,j \in \{1, \ldots, M_k\}$. Our $\psi$ function is defined as:

$$\psi(\hat{f}_{k,i}, \hat{f}_{k,j}) = \exp\left(-\frac{\|\hat{f}_{k,i} - \hat{f}_{k,j}\|_2}{\sigma_{Ncut}}\right) \quad (14)$$

with $\sigma_{NCut}$ a bandwidth parameter.

The traditional NCuts is designed to compute affinity in both the spatial and data domains, such as color domains. As a result, the $\psi$ function has a spatial constraint introduced such that Equation 14 is set to zero if the associated pixels are farther away than a user specified distance. Because of this spatial constraint, the affinity matrix (12) $\psi$ is normally sparse, making its storage and operations less burdensome. Since the algorithm is only concerned with identifying data, such as colors, corresponding to those in the swatch, there is no direct concern with preserving spatial contiguity as in the original NCuts algorithm. One can see that the removal of the spatial constraint no longer guarantees sparse matrices, making the eigenvalue computation nearly intractable for very large matrices. By operating in the data space, such as a color space, limited by a hierarchical pyramid, one not only regain the lost efficiency but also experience additional speed benefits.

The main steps comprising the HNCut technique are shown in an algorithm, which can begin by applying NCuts on the lowest image resolution. By setting $k=K$, $V_k = \{\hat{f}_{k,1}, \hat{f}_{k,2}, \ldots, \hat{f}_{k,M_k}\}$, i.e. the set of unique color values present at level K from the application of FWMS.

Step 1: Can apply NCuts to partition the scene into two disjoint color sets A and B, where $A, B \subset V_k$. To perform this partition, one can compute the affinity matrix $\Psi_k \in R^{M_k \times M_k}$ using Equation 14 for all $i,j \in \{1, \ldots, |V_k|\}$. $\sigma_{NCut}$ is a scaling parameter set to some initial σ value.

Step 2: As a result of the partitioning, one needs to identify if either A or B uniquely contains all colors in $S_k$. Hence if $S_k \subseteq A$ and $S_k \cap B = \emptyset$ then eliminate all colors in B by setting $V_k = A$. If $S_k \subseteq B$ and $S_k \cap A = \emptyset$ similarly eliminate A by setting $V_k = B$. However if $S_k$ is not uniquely contained in either A or B, one can increase Ncuts and proceed back to Step 1. One can keep incrementing $\sigma_{NCut}$ until $S_k$ is uniquely contained within either of A or B, and set $V_k$ to that partition.

Step 3: The process can be begun again with the new $V_k$ until no further partitioning of the data space, such as the color space, at level k is possible. That is until $S_k$ cannot be contained uniquely within a single color partition for any value of $\sigma_{NCut} < \sigma_{max}$.

Step 4: Using this process, one can sequentially climb the hierarchical data structure $\hat{F}_k$ where $k \in \{1, \ldots, K\}$. Thus, one can migrate to the next higher image resolution, level k−1 and set $V_{k-}$ to $V_k$, i.e., the set of colors retained at resolution level k and repeat the process again. One can continue to return to Step 1 until k=1.

Step 5: At level 1, $V_1$ contains a subset of values from $\hat{F}_1$ which are considered to be the chromatic values of the region of interest. Thus the final image is computed by retaining all pixels $j \in \{1, \ldots, N\}$ such that $f_{1,j} \in V_1$, and eliminating the others.

Algorithm 2 NCuts on FWMS Reduced Color Space

Input: $\hat{F}_1, \hat{F}_2, \ldots, \hat{F}_K, S_1$
Output: $V_1$ is returned. which contains all retained color values
1:     k = K
2:     $V_k = \hat{F}_k$
3:     Using Equation 14 build $\Psi_k$ from $V_k$
4:     while k ≠ 1 do
5:         $\sigma_{NCut}$ = initial σ value
6:         while $\sigma_{NCut} < \sigma_{max}$ do
7:             Solve for A, B using Eq. 13
8:             if $S_k$ is not uniquely contained in A or B then
9:                 Increment $\sigma_{NCut}$
10:            else
11: 
$$V_k = \begin{cases} A, & \text{if } S_k \subseteq A \\ B, & \text{if } S_k \subseteq B \end{cases}$$
12:            end if
13:            Using Equation 14 re-construct $\Psi_k$ from $V_k$
14:         end while
15:         k = k − 1
16:         $V_k = \hat{f}_{k,i}, \forall_i$ where $f_{k+1,i} \in V_{k+1}$
17:         Using Equation 14 re-construct $\Psi_k$ from $V_k$
18:     end while
19:     return $V_1$ The hierarchical set of operations described above can make for an extremely efficient and accurate algorithm. Computing the affinity matrix and performing the normalized cut for the lowest levels of the pyramid is relatively simple to do and encourages a more sophisticated definition of affinity using additional image features (e.g. intensity, texture) along with color or in lieu of color. In the present example, only chromatic information was available and used, but this method can be easily and efficiently extended to incorporate additional image features (e.g. intensity and texture) into the definition of $\psi$.

Applicants have tested certain examples of the disclosed subject matter, a description of the data and experimental setup follows. The image database utilized comprised of a total of seven digitized TMAs of ovarian cancer (OCa). This comprised a total of over 500 tissue cylinders from 100 patients, from which applicants selected 130 as a test set. The TMAs were obtained by sampling OCa tissue and were stained for the presence of the tissue vascular marker ESM-1, resulting in vascular regions with the antibody to ESM-1 staining brown. The digitized versions of the TMAs were obtained by scanning the slides at 40× resolution on a whole slide digital scanner, but subsequently these were downsampled and stored at 20× magnification. This resulted in over 500 digital images of individual cylinders, each of which were approximately 1,500×1,500 pixels in dimension.

An expert pathologist laboriously annotated the precise spatial extent of the tumor vascular markers ("TVMS") on all of the 130 tissue cylinders considered for the test. All 500 cylinders were not used for quantitative evaluation, due to the effort involved in manually annotating each of the cylinders. The 130 cylinders were randomly picked from the set of 500. A total of 4 experiments were conducted to evaluate the accuracy, efficiency, and reproducibility of the HNCut algorithm. These are described below. All experiments were run on a 2.8 Ghz Linux machine running Matlab 2008b with 32 Gb of RAM.

The first experiment compared HNCuts as described herein with PBT and k-means. To evaluate accuracy of HNCut, applicants compared detection performance with that of k-means and PBT. A standard k-means algorithm was performed using 10 clusters. Since k-means is not deterministic and notoriously sensitive to the choice of cluster centers, the best possible initial cluster centers were manually chosen, by experimentation.

PBT was implemented as described in the Tu reference using suggested default values for both of PBT's variables 0 and e (0.45 and 0.4 respectively). PBT iteratively generates a hierarchical tree structure in the training stage where each node of the tree is converted into an Adaboost classifier as indicated in Freund, Y., et al., A decision-theoretic generalization learning and application to boosting, Journal of Computer and System Sciences, 55(1), 119-139 (1997). This constituted 7 weak classifiers. During testing, the conditional probability of the sample belonging to the target class is calculated at each node based on the learned hierarchical tree. The discriminative model is obtained at the top of the tree by combining the probabilities associated with probability propagation of the sample at various nodes. Unlike other commonly used classifiers, such as AdaBoost and decision trees which provide a hard binary classification, PBT generates a posterior conditional probability value $p(1|c)$, $p(-1|c)$ ∈ $[0,1]$, for each sample c as belonging to one of the two classes.

Figure 6A:
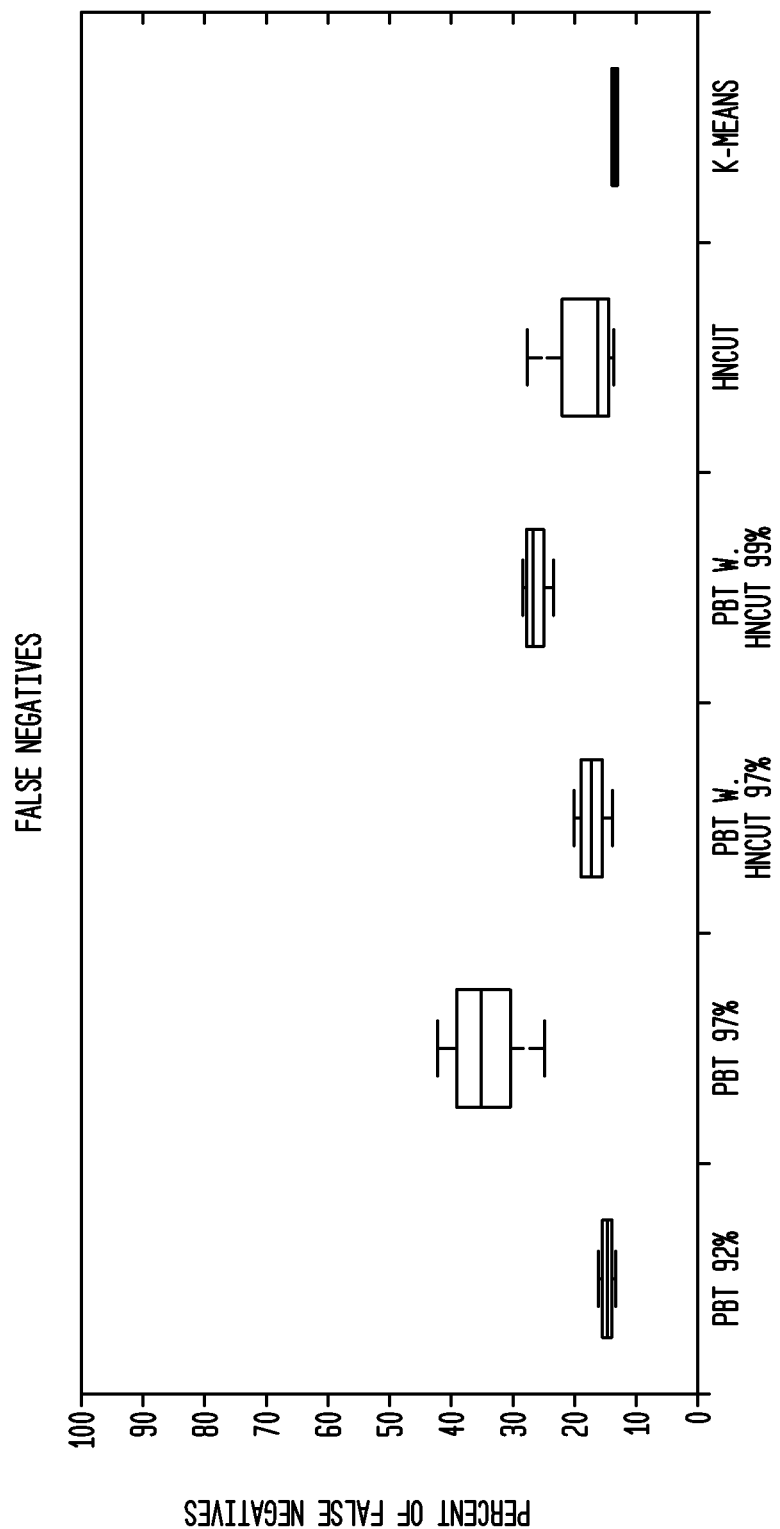
FIG. 6(a) depicts a mean and variance of False Negatives ("FNs")
Figure 6B:
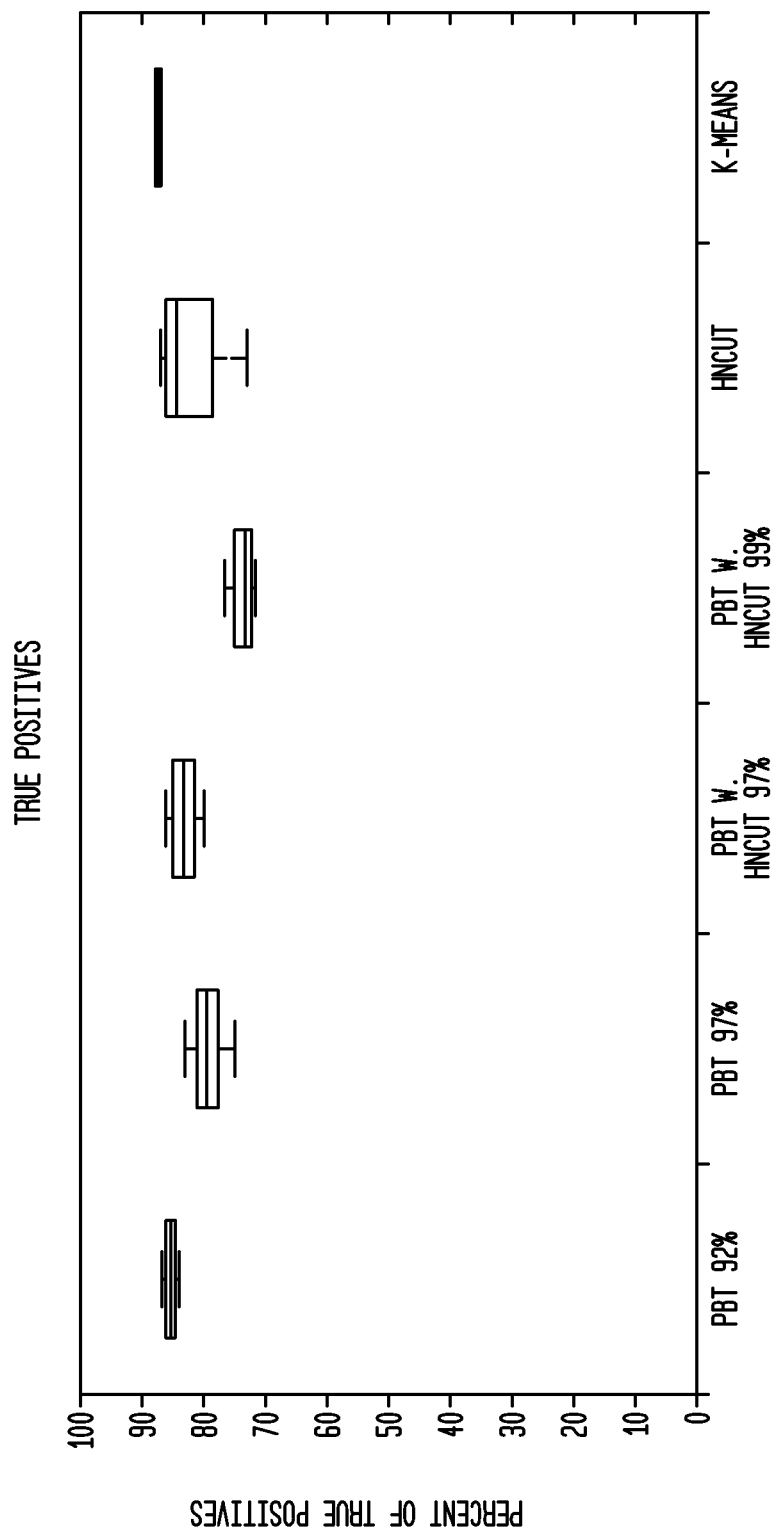
FIG. 6(b) depicts a mean and variance of True Positives ("TPs")
Figure 6C:
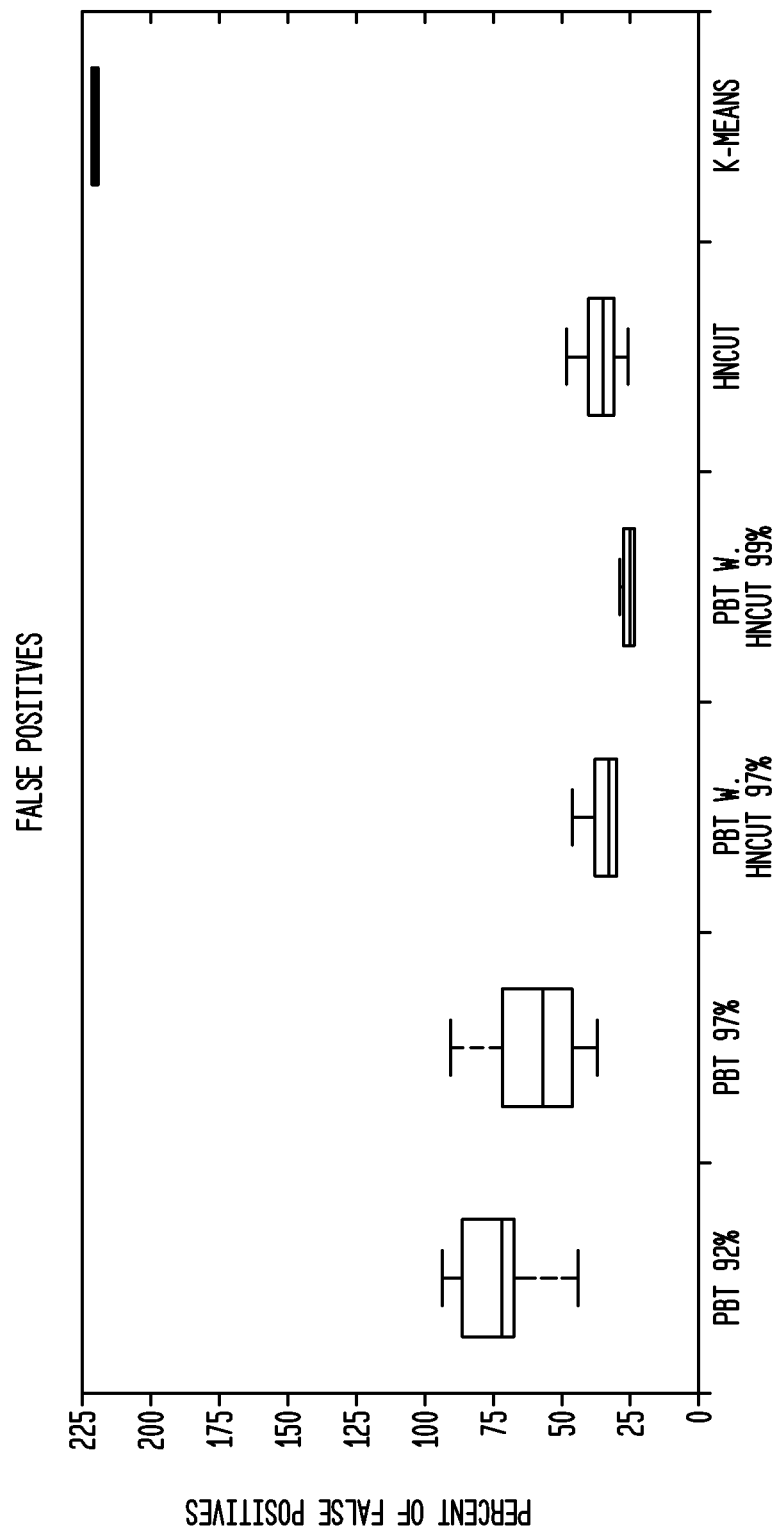
FIG. 6(c) depicts a mean and variance of False Positives ("FPs") over 10 runs for the PBT classifier (92% and 97% threshold), PBT classifier trained using HNCut (97% and 99% threshold), HNCut and k-means over 130 images.
Figure 6D:
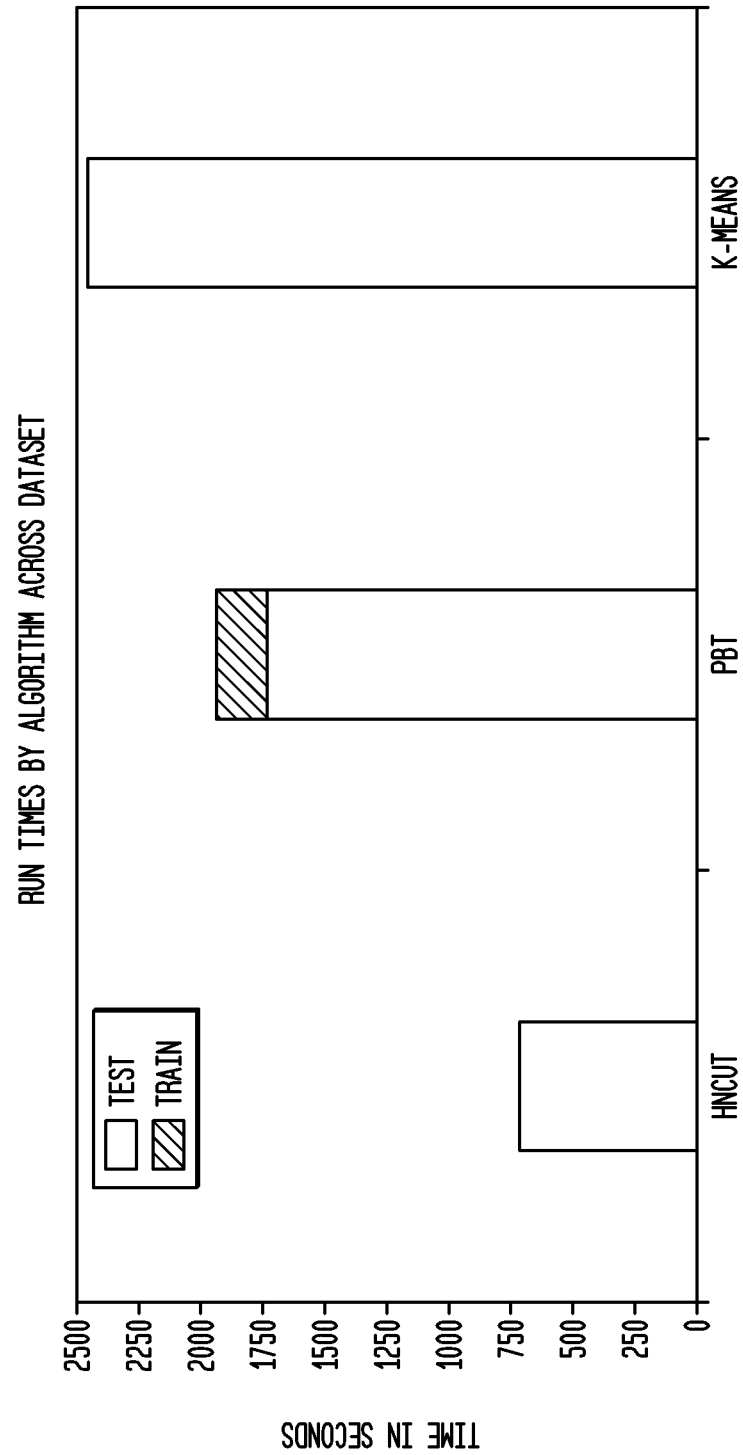
FIG. 6(d) illustrates that HNCut significantly outperforms both the PBT and k-means algorithms, at least in terms of execution time.

The feature vector was created by taking a 3×3 window around every c∈C, across all 3 color channels in hue, saturation, value ("HSV") space, resulting in a 27 dimensional vector. 1000 random positive (stained) samples and 1000 random negative (unstained and spuriously stained) samples were selected from 25 randomly selected images, resulting in a total training vector of size 27×50,000. Training and testing was done via 50 runs of cross validation. This consisted of randomly selecting 25 images and training the classifier as described above, followed by testing on the other 105 images. FIG. 6(a) depicts a mean and variance of False Negatives ("FNs"); FIG. 6(b) depicts a mean and variance of True Positives ("TPs"); FIG. 6(c) depicts a mean and variance of False Positives ("FPs") over 10 runs for the PBT classifier (92% and 97% threshold), PBT classifier trained using HNCut (97% and 99% threshold), HNCut and k-means over 130 images; FIG. 6(d) illustrates that HNCut significantly outperforms both the PBT and k-means algorithms, at least in terms of execution time. The probability returned by the PBT were thresholded at 92% and 97% (represented as the first two columns in FIG. 6(a)).

The choice of these thresholds was determined as follows. During each run of the randomized cross validation, a receiver operating characteristic ("ROC") curve (representing the trade off between sensitivity and 1-specificity) was generated and thresholded at the determined operating point. This value was found to range between 92% and 97%. FIGS. 6(a)-(c) also depict Mean and variance of (a) False Negatives (FN), (b) True Positives (TP) and (c) False positives (FP) over 10 runs for the PBT classifier (92% and 97% threshold), PBT classifier trained using HNCut (97% and 99% threshold), HNCut and k-means over 130 images.

In the case of PBT this involved 10 runs using different training and testing sets, while for HNCut we selected 10 different swatches. Line 150 indicates the mean value, the box 152 represents the 25th percentile of values on either side of the mean, and the line 154 encompasses the 75th percentile of values on either side of the mean.

Figure 5:
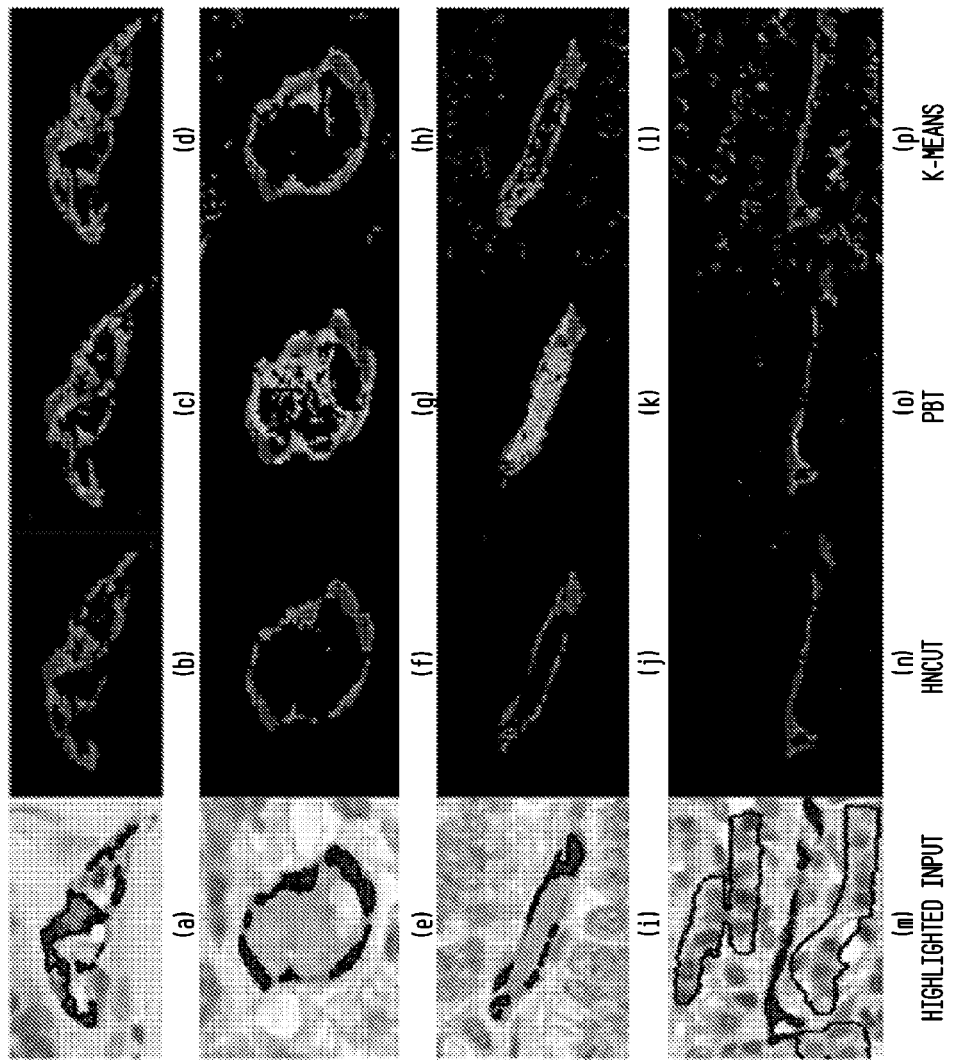
FIG. 5 illustrates ground truth annotations of vascular stained areas on 4 different cylinders, corresponding segmentation results from HNCut, and k-means using 10 clusters, according to aspects of an embodiment of the disclosed subject matter.

FIG. 5 illustrates ground truth annotations of vascular stained areas on 4 different cylinders, corresponding segmentation results from HNCut, and k-means using 10 clusters, according to aspects of an embodiment of the disclosed subject matter. In FIG. 5, the first column ((a), (e), (i), (m)) represents the ground truth annotations of the vascular stained areas on 3 different cylinders. In FIG. 5, Columns 2-4 (left to right) represent corresponding segmentation results from HNCut ((b), (f), (j), (n)) for $\sigma_{MS}$=0.05, PBT ((c), (g), (k), (o)) at the 97% threshold, and k-means ((d), (h), (i), (p)) using 10 clusters. It can be seen that k-means always overestimates the stain extent, resulting in a large number of false positives. While PBTs perform better compared to k-means, (g) and (k) show how the PBT can occasionally retain spuriously stained pixels.

On the other hand, results using the HNCuts technique disclosed herein closely resemble the ground truth. Note however that none of the algorithms are able to correctly identify the faintly stained regions in the upper portion of (m), since the stain there is barely discernible. The plots in FIG. 6(a)-6(d) reveal that HNcuts outperforms k-means and PBT (92% and 97% thresholds) and performs comparably to a PBT trained with HNCut (97% and 99% thresholds) in terms of false positives, false negatives and true positives. FIG. 6(d) reveals that HNCuts significantly outperforms both the PBT and k-means algorithms in terms of execution time.

The setup of HNCut was as follows. The FWMS was performed using $\sigma_{MS}$=0.05. NCut was subsequently performed using the Silverman function as discussed in the Yang reference to determine the value for the initial $\sigma_{Ncut}$, which was then incremented by a factor of 10 as prescribed in step 9 of the Algorithm noted above. The affinity measure for NCut is also as defined in that Algorithm.

The Improved Fast Gauss Transform's clustering variable, as also suggested by the Yang reference, was set to the square root of the number of data points. When the number of remaining clusters fell below this value, it was reset to the square root of the number of remaining clusters. The procedure that was used to enforce the $\epsilon$ distance requirement in Equation 9 was implemented as follows. Since most humans are unable to easily discriminate between subtle variations of the same color, we can set $\epsilon$ to a relatively large value. The easiest way to apply this $\epsilon$ requirement in an algorithmic form is to simply choose the desired precision level (such as 10, 0, 0.01 or 0.001, depending on the format of the data) and then simply round the value to the right of that place.

Since the data was stored using double precision in the range [0, 1], applicants used the thousandths decimal place. The subsequent procedure of locating unique values and computing their frequencies is as simple as generating a histogram of the data values with each unique value occupying its own bin. This is a significant benefit, as the production of histograms is not only well studied but easily converted into a parallel computing problem as suggested in Parallel and Distributed Computing Handbook, McGraw-Hill, Inc., New York, N.Y., USA (1996).

A second experiment was performed to examine the reproducibility of the performance of HNCuts with respect to swatch and parameter sensitivity. The results produced by HNCut are dependent upon the selection of the swatch and the size of the $\sigma_{MS}$ bandwith parameter. Clearly if there is a great deal of heterogeneity within the target class and the choice of swatch is not representative of the target class, the quality of the segmentation can be sub-optimal. Consequently, the user has the choice of either (a) sampling additional values corresponding to the target class, or (b) repeating the segmentation with HNCut a few times with different swatches until the desired target class segmentation is obtained. Both tuning procedures are only made possible by the superior computational efficiency of HNCut.

A third experiment was performed to examine the efficiency and speed of HNCut.

A property of HNCut according to aspects of the disclosed subject matter has to do with the efficiency of FWMS compared to the traditional MS. To quantitatively evaluate the computational savings in using FWMS compared to MS, the MS and FWMS procedures were executed over a total of 20 iterations and the corresponding iteration times graphed. Additionally, applicants compared the time it took for PBT, k-means, and HNCut to segment all 130 tissue cylinders.

A Turing Test was performed. The original Turing test as discussed in Turing, A., Computing Machinery and Intelligence, Mind, LIX, 433-460 (1950) is a test of a machines ability to demonstrate intelligence. A human judge is blinded and attempts to differentiate between a human and a machine using only a natural language conversation. If the judge cannot differentiate reliably between the machine and the human, the machine is said to have passed the Turing test. The question applicants poses is similar: is it possible to differentiate a supervised classifier trained with human annotated data from a supervised classifier trained with HNCuts segmented data? To examine this question, applicants performed 10 iterations of the training/testing procedure using the HNCut output as the ground truth for training in the PBT, and compared it against the PBT output resulting from the pathologist annotated data. The choice of thresholds was determined in a similar fashion as first experiment discussed above, except the operating point was found to range between 97% and 99%, and thus applicants chose those two values.

The HNCuts algorithm was evaluated both in terms of its ability at identifying pixels whose colors are within the swatch and also in terms of identifying contiguous vascular regions annotated by the pathologist. Both pixel level and region level statistics were required in order to comprehensively and reliably evaluate the HNCuts' performance.

Applicants define $R^{a,\zeta}$ as the regions identified by HNCut and $R^{b,z}$ as the corresponding expert annotated regions, with $$R^{b,z}, \frac{|R^{b,z} \cap R^{a,S}|}{|R^{b,z}|}$$

$$z \in \{1, \ldots, Z\}$$

and $\zeta \in \{1, \ldots \dot{y}\}$. If for any $$R^{b,z}, \frac{|R^{b,z} \cap R^{a,S}|}{|R^{b,z}|} > 0.3$$

then $R^{a,\zeta}$ is identified as a true positive (TP). If for any $R^{a,\zeta}$ there is no $R^{a,\zeta}$ for which this condition is satisfied then $R^{a,\zeta}$ is identified as a false positive (FP). If there is an $R^{b,z}$ for which no $R^{a,\zeta}$ can be found that satisfies the above condition, $R^{b,z}$ is deemed to be a false negative (FN). Pixel-level statistics were defined using the formulations presented below, $$P^a = \bigcup_{\varsigma=1}^{\dot{y}} R^{a,\varsigma} \tag{15}$$

$$P^b = \bigcup_{z=1}^{Z} R^{b,z} \tag{16}$$

$$TP = \frac{|P^a \cap P^b|}{|P^b|} \tag{17}$$

$$FP = \frac{|P^a - (P^a \cap P^b)|}{|P^b|} \tag{18}$$

-continued $$FN = \frac{|P^b - (P^a \cap P^b)|}{|P^b|} \quad (19)$$

and lastly the true negatives (TN) as:

$$TN = \frac{|C - (P^a \cup P^b)|}{|C - P^b|} \quad (20)$$

Accordingly the results of the first experiment noted above comparing HNCuts to PBT and k-means, a subset of the results are presented in FIG. 6. The first column represents the original input image, with the boundary of the ground truth highlighted by the pathologist and labeled in red. The first row illustrates a case where all of the algorithms performed comparatively. The second row illustrate instances where the HNCut algorithm performs better compared to PBT and k-means, both of which yield several false positives. The third row is used to illustrate a scenario where false negatives occur for all three methods. The middle region for the image in FIG. 6(i) is correctly segmented in all algorithms, while the three other regions are incorrectly rejected. This specific image is a very difficult case where the stain in those regions is only barely visible to an expert. The k-means approach results in the largest number of positives compared to the two other methods; a consequence of k-means requiring all pixels to be assigned to a cluster. Table 2 illustrates results.

Figure 7:
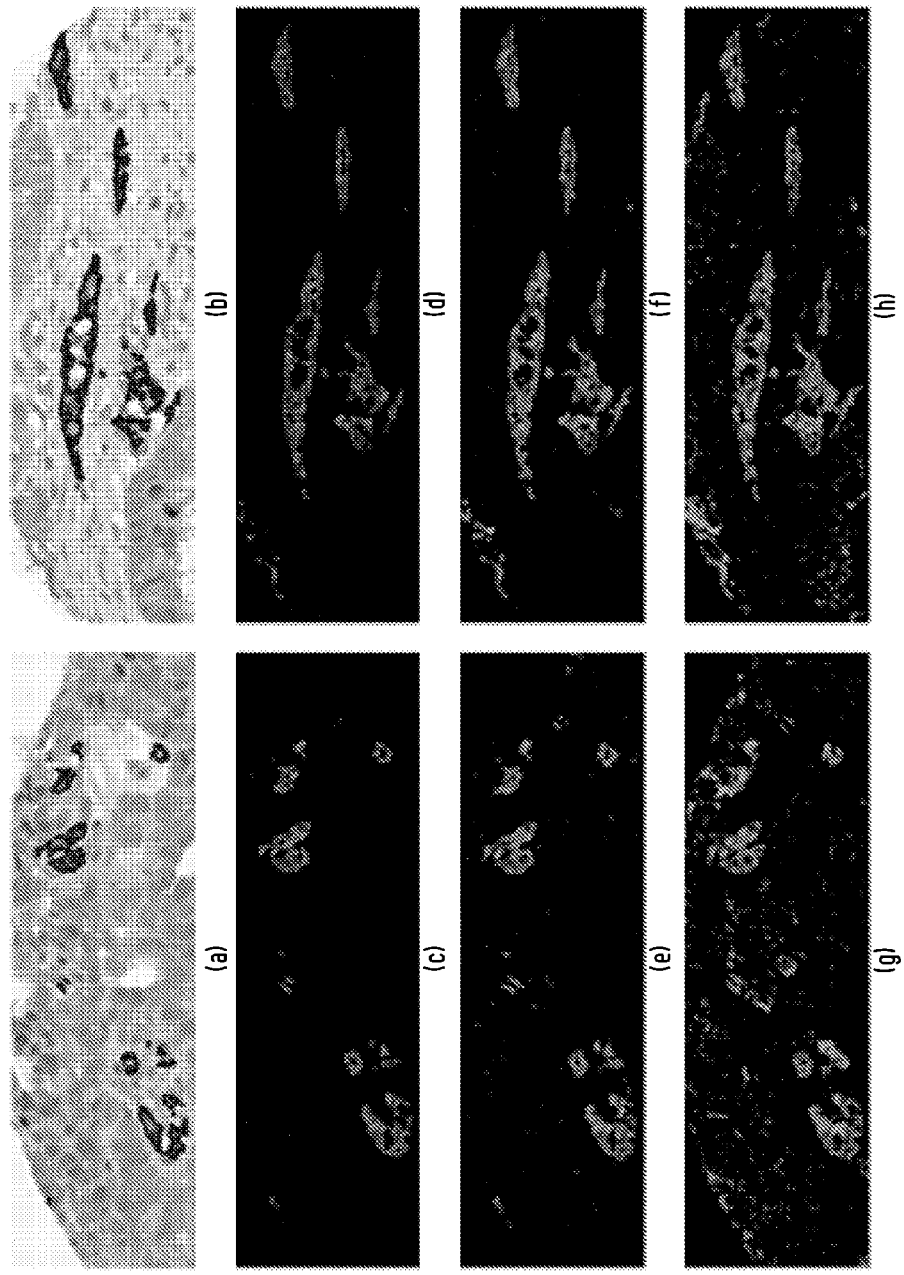
FIG. 7 depicts two bands presented across selected TMA cylinders.

FIG. 7 depicts two bands presented across selected TMA cylinders. FIGS. 7(a) and 7(b) depict original input, with the annotated ground truth in red, presented on the top. FIGS. 7(c) and 7(d) illustrate results from applying HNCuts according to aspects of an embodiment of the disclosed subject matter, FIGS. 7(e) and 7(f) show PBT results; and FIGS. 7(g) and 7(h) show k-means results.

Figure 8:
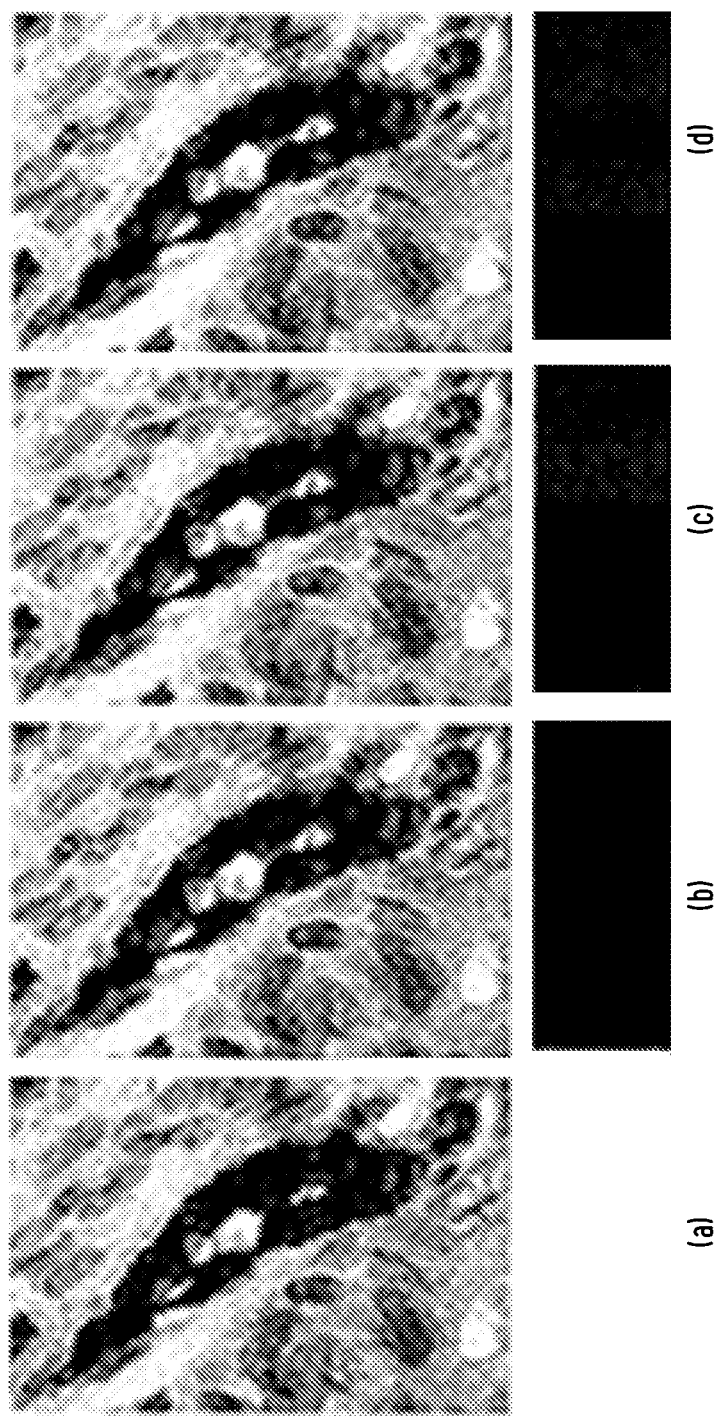
FIG. 8(a) depicts ground truth annotation in red of a stain extent obtained from an expert pathologist.
FIG. 8(b) depicts a segmentation result created using a swatch comprising 7 selected pixels, according to aspects of an embodiment of the disclosed subject matter.
FIG. 8(c) depicts a segmentation result using the same values as FIG. 8(b) with the addition of another 5 values.
FIG. 8(d) depicts a segmentation result with 18 values selected from the original image.

The results of the second experiment noted above, relating to reproducibility of HNCuts with respect to swatch and parameter sensitivity are shown in FIGS. 8(a)-(d). FIG. 8(a) depicts ground truth annotation of stain extent obtained from an expert pathologist. The segmentation result shown in FIG. 8(b) was created using a swatch comprising 7 selected pixels. The next column FIG. 8(c) depicts the same values as FIG. 8(b) with the addition of another 5 values. The final column FIG. 8(d) has 18 values selected from the original image. The red line encapsulates the results of the segmentation algorithm. It can be seen that the first set of results FIG. 8(b) are fairly good, but as more class representative samples are used to construct the swatch the results improve even further (FIG. 8(c) and FIG. 8(d)). FIGS. 8(a)-(d) show qualitative results reflecting the sensitivity of the segmentation to the choice of the swatch. A small patch was randomly selected from the desired class by a non-expert user.

The resulting segmentation was overlaid using a red boundary on the original image. Subsequently, a few additional pixels were added to the swatch, and the segmentation repeated. In FIG. 8(b) it can be seen that when the user selects dark pixels within the swatch, the segmentation focuses on

TABLE 2

|  | True Positive | True Negative | False Positive | False Negative |
| --- | --- | --- | --- | --- |
| HNCut | 59.24% ± 7.36% | 99.01% ± 0.56% | 175.2% ± 162.38% | 39.95% ± 7.36% |
| PBT (92%) | 62.65% ± 0.87% | 98.09% ± 0.16% | 183.84% ± 45.97% | 35.71% ± 0.87% |
| PBT (97%) | 51.72% ± 3.26% | 98.33% ± 0.07% | 114.20% ± 21.02% | 46.65% ± 3.26% |
| PBT W. HNCut (97%) | 58.70% ± 4.09% | 98.46% ± 0.06% | 77.99% ± 18.31% | 39.66% ± 4.09% |
| PBT W. HNCut (99%) | 46.03% ± 2.53% | 98.56% ± 0.02% | 47.93% ± 4.86% | 52.34% ± 2.53% |
| k-means | 71.89% | 97.56% | 597.45% | 27.3% |

Qualitative results presented for the pixel-level metric across all of the algorithms are seen in Table 2. The ±value is the percent variance associated with the difference in running the algorithms with 10 different training sets or swatches. FIG. 6 and Table 2 quantitatively illustrate the mean and variance of various metrics for the different setups across 10 runs. Thus the closer the spread markers 152, 154 are to the mean 150, the more consistent the algorithm was able to perform. HNCuts provides a similar mean for false negatives, while still providing a similar percentage for true positives. The false positive rate for HNCuts versus PBT reveals that HNCuts on average yields better performance, with a much smaller variance. The threshold of 92% for the PBT encourages few false negatives at the cost of many false positives.

Randomly generating the training set for the PBT from the ground truths provided by the expert seems to lead to a larger variance in the false positive metric. This can be as a result of human error in performing the ground truth annotation, or in the selection of pixels that do not truly mimic the rest of the desired class. The k-means technique can do quite poorly. There is no variance associated with the algorithm since applicants determined the optimal centers offline, thus removing the non-determinism. FIGS. 5 and 7 reveal why there are so many false positives associated with k-means since it tends to retain in the stain class many spuriously stained pixels.

the darker aspects of the stain. When the swatch shown in FIG. 8(d) was used (a true representation of the variance in the target class) the results approached the annotations of the expert.

Note that a non-expert user could determine easily which areas of the target class were not sampled from and include those in the swatch. This iterative process can be repeated until the non-expert user observes the results that match the exact desired output. Once the domain swatch is selected, it safely can be used for the rest of the images in the TMA set.

$\sigma_{MS}$ is a parameter used in FWMS that is sensitive to the dataset considered. In FIGS. 9(a)-(e), the importance of selecting the correct $\sigma_{MS}$ becomes apparent. In the case where the $\sigma_{MS}$ value is too large, the FWMS aggregates together pixels not contained within the swatch. As a result, they never can be pruned away as shown in FIG. 9(b). The highlighted blue section is dark enough in color that it becomes associated with the stain due to the large bandwidth selection. On the other hand, when the appropriate swatch representative of the desired target class is selected, almost any $\sigma_{MS}$ value becomes acceptable as shown with the extremely small $\sigma_{MS}$ 0.01 in FIG. 9(c). In the case where a swatch that is not representative of the target class is selected, as in FIGS. 9(d), (e) and (f), the results are sensitive to the choice of value for $\sigma_{MS}$. In applicants' specific application, using HNCuts on 500 discs, about 10 of them failed to converge properly, resulting in poor segmentations. These 10 images all had little to no stain present. By computing the variance of the color pixels in the segmented output against the domain swatch, one can assess the performance of HNCuts and make relevant adjustments in an unsupervised manner. For instance, if the variance is larger then desired, adjusting $\sigma_{MS}$ to a smaller value can produce new output that is more similar to the domain swatch. For all 10 images considered in this experiment, the scheme for automatically adjusting $\sigma_{MS}$ produced excellent results.

Figure 9:
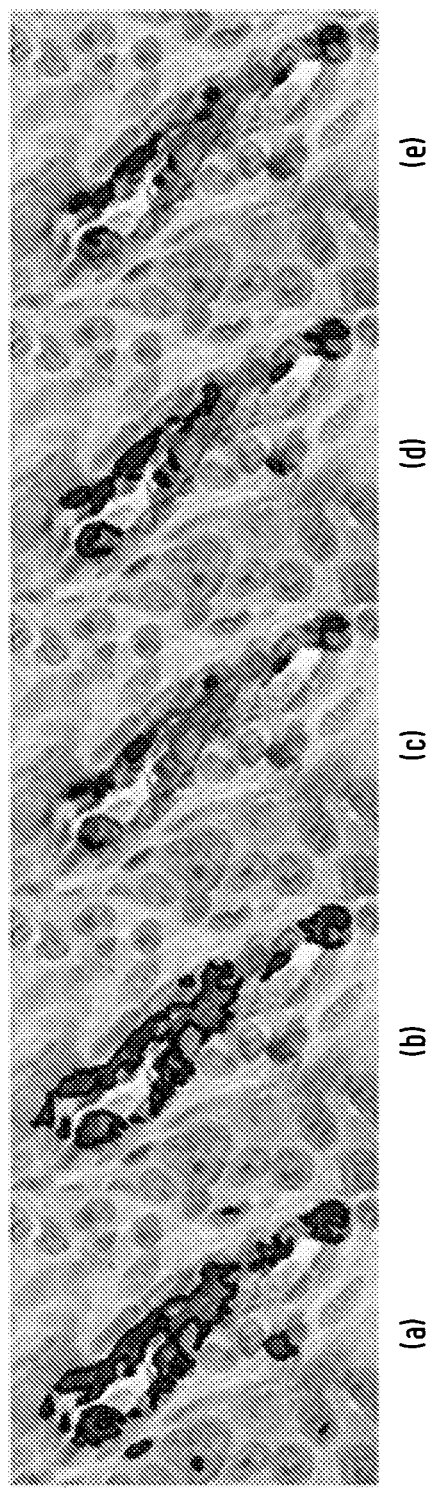
FIG. 9(a) depicts ground truth segmentation of a stain extent obtained from an expert pathologist.
FIGS. 9(b) and 9(c) depict segmentation outputs for two different $\sigma_{MS}$ values.
FIGS. 9(d) and 9(e) depict segmentation outputs for $\sigma_{MS}$ values of 0.01 and 0.3 respectively, except that an improper domain swatch was selected.

FIG. 9 depicts ground truth (pathologist) segmentation of stain extent obtained from an expert pathologist. FIG. 9(b) and FIG. 9(c) depict segmentation outputs for two different $\sigma_{MS}$ values. The HNCuts algorithm rarely experiences unacceptable segmentations except in the case of too small of a $\sigma_{MS}$ value if the domain swatch is incorrectly defined. FIGS. 9(d) and 9(e) depict segmentation outputs for $\sigma_{MS}$ values of 0.01 and 0.3 respectively, except that an improper domain swatch was selected.

Regarding the results of the third experiment discussed above regarding efficiency and speed considerations for the HNCuts algorithm, in order to clearly illustrate the high-throughput capabilities of HNCuts, applicants compared its runtime to PBT and k-means. FIG. 6(d) illustrates a graphical representation of the results. From the onset it can be seen that PBT's training time of 181 seconds accounts for 25% of HNCut's 643 second run time. Typically this training time is divided amongst all of the tested samples, thus the more samples that are tested, the cheaper it becomes to train the system.

Regardless, even upon excluding the training time for PBT, HNCuts still performs significantly faster. The average of 16 seconds per sample by PBT is easily overshadowed by the runtime of 6 seconds per sample by HNCuts. This implies that HNCut is roughly 62% faster compared to PBT. On much larger images, the difference in execution time becomes even more apparent.

Figure 10:
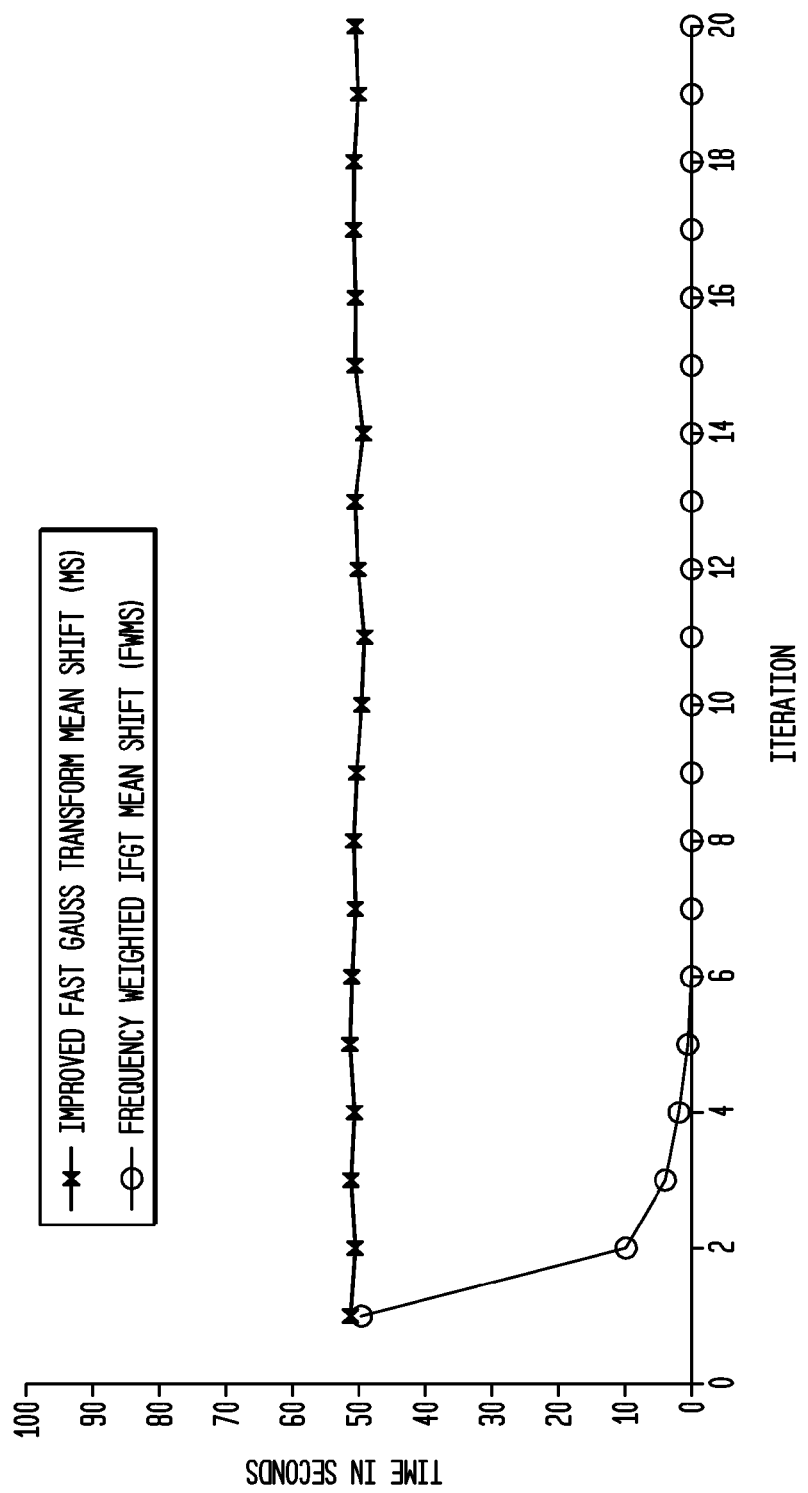
FIG. 10 depicts a graph showing a typical time for each iteration of the MS and FWMS procedures.

FIG. 10 depicts a graph showing a typical time for each iteration of the MS and FWMS procedures. FIG. 10 shows the numerical advantages to using FWMS over MS. When the initial number of points is large, after each iteration, fewer computations need to be performed. The larger s is selected, the faster FWMS will converge, on the other hand, when $\epsilon$ is selected to be extremely small the execution time for FWMS begins to approach that of MS. FIG. 10 depicts a graph showing the typical time for each iteration of the MS and FWMS procedures. The original Improved Fast Gauss Transform (MS) Mean shift 160 has constant time for each iteration. The benefits of the Frequency Weighted Mean Shift (FWMS) algorithm 162 become apparent within a few iterations of the clustering procedure as each additional iteration requires significantly less time as additional data points converge to the cluster mean.

Regarding the Turing test noted above, the results presented in FIGS. 6(a)-(d) suggest that when a PBT is trained with the results from the HNCut, the results are actually superior to all other classifier configurations considered (including PBT, k-means, and HNCuts), with a much smaller standard deviation. In the case of false positives, the variance at the 99% threshold is almost negligible, giving a high confidence of reproducibility. As a result, the output suggests that it is possible to use HNCuts as a layman's initialization to produce data that is of a similar quality as the expert's laborious annotation work, minimizing user interaction. Based on these results, HNCut would appear to pass the Turing test for segmentation.

Figure 11:
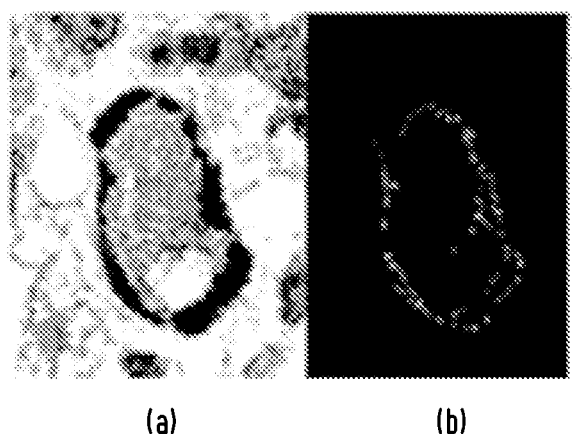
FIG. 11(a) depicts an original region with ground truth enclosed in red.
FIG. 11(b) depicts an HNCut output of FIG. 11(a) which is reasonably close to optimal segmentation.

FIG. 11(a) depicts a fully zoomed-in and stained region with ground truth circled in red; and FIG. 11(b) depicts an HNCut output which is reasonably close to optimal segmentation. In regard to the fifth experiment noted above relating to using tissue microarrays ("TMAs") technology, as illustrated in FIG. 1(a), it now is possible to simultaneously stain several hundred tissue sections (called cylinders, FIG. 1(b)) according to aspects of an embodiment of the disclosed subject matter for the presence of various biomarkers. Since manual analysis of such large amounts of data is not tractable, high-throughput, reproducible and accurate computerized image analysis methods are required for quantifying the extent of stain associated with different biomarkers.

Figure 12:
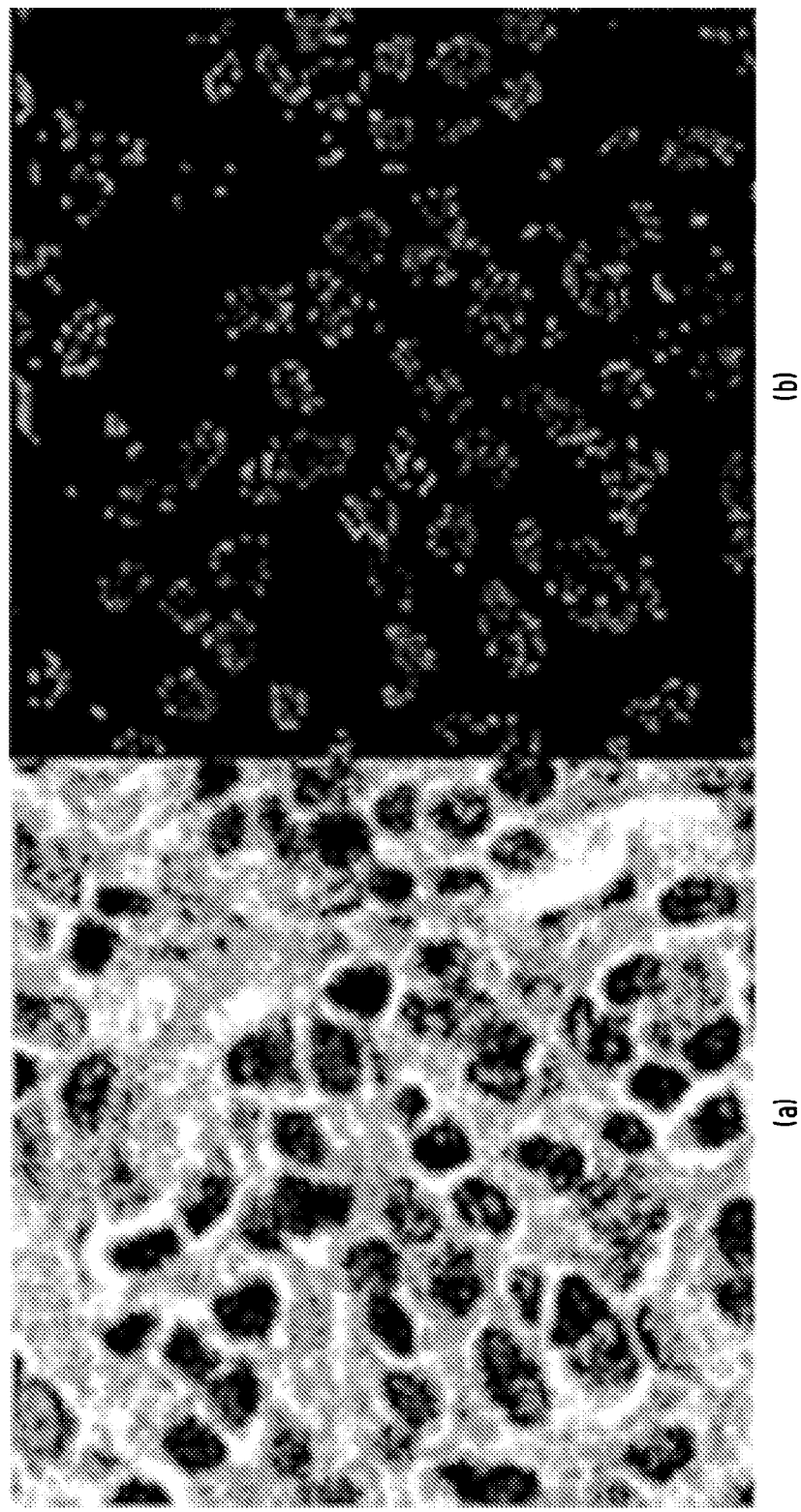
FIG. 12(a) depicts an original lymphocyte image.
FIG. 12(b) depicts an HNCut segmented output for the image of FIG. 12(a)

Since the domain knowledge is captured by a few manually annotated pixels from the target class, it can be changed easily. This provides HNCuts with the flexibility to operate in different domains quite easily. FIG. 12(a) depicts an original lymphocyte image; and FIG. 12(b) depicts an HNCut segmented output for the imge of FIG. 12(a). As an example, applicants selected a few representative pixels from the lymph cells in FIG. 12(a), and were able to provide nearly optimal segmentation in about 1 second as seen in FIG. 12(b). This shows the flexibility of HNCuts and how in a few seconds HNCuts can switch domains and provide good quality segmentations.

Figure 13:
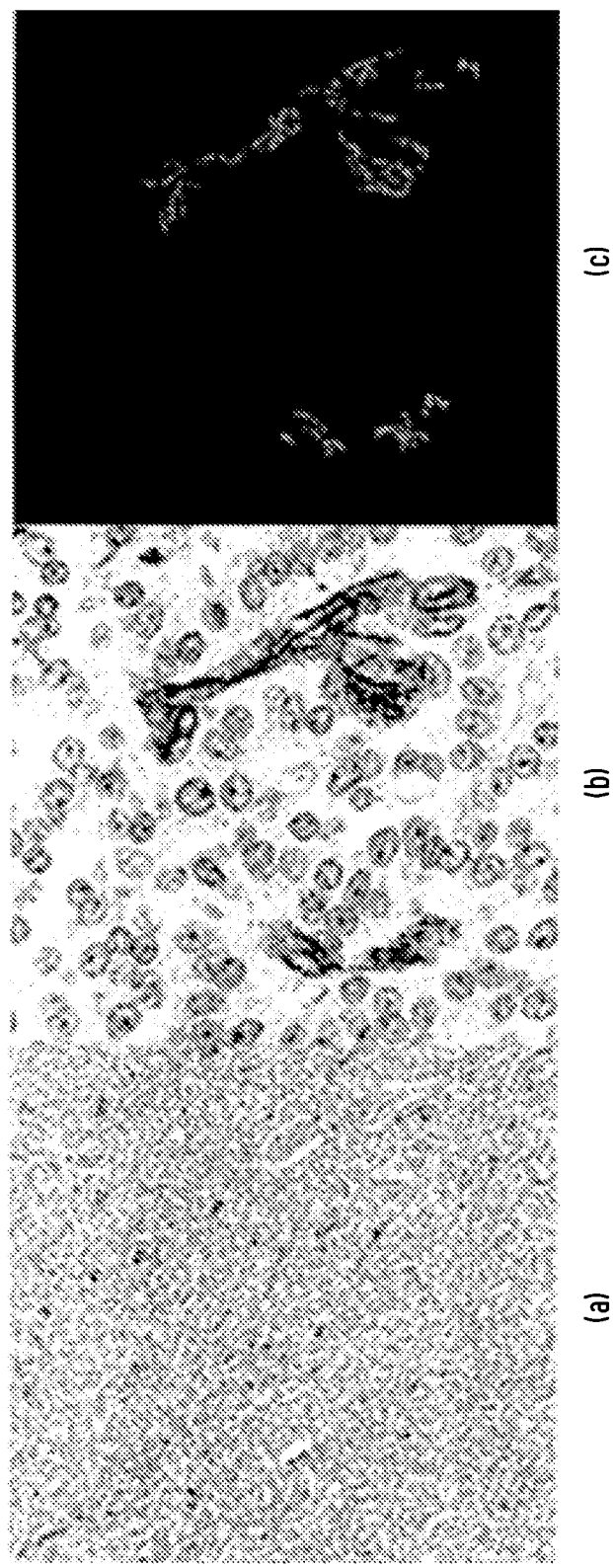
FIG. 13 (a) depicts a vascular stain on a whole mount histology image of size 4,000×3,000.

Another example is in the domain of segmenting vascular stains on whole mount histology as illustrated in FIG. 13. FIG. 13 (a) depicts a vascular stain on a whole mount histology image of size 4,000×3,000; FIG. 13(b) depicts a zoomed-in section of the stain of FIG. 13(a); and FIG. (c) depicts its associated near optimal segmentation obtained according to processes implementing aspects of an embodiment of the disclosed subject matter. While these images also tend to be very large, it becomes possible to again change the domain swatch by selecting a few representative pixels and then receive highly accurate segmentations in a rapid manner.

As with any segmentation algorithm, HNCuts is also subject to false positive and false negative errors. Some such errors and their causes are discussed below. Since the stain severity is proportional to the quantity of the biomarker, the stain will vary greatly in intensity of color across not only all cylinders but also across all stained areas themselves. This high variance is one of the reasons why thresholding and k-means type algorithms tend to do poorly. Additionally, the rims of the cylinders are often corrupted with noise which manifests as a dark stain. The removal of these artifacts could be done by simply choosing to ignore pixels that lie on or very close to the cylinder boundary.

In the situation where the disc is not well formed, either on account of tissue tearing or an absence of cells, there is the possibility for large scale pooling of false positive stain within the void. Since the chromatic qualities of the false positive regions are very similar to true positive areas, this specific type of error is difficult to identify and eliminate.

Psammomas are calcified material within the center of a laminated whorl of elongated fibroblastic cells. Unfortunately, psammomas are exactly the same in color and texture as the true positives, making it difficult even for an inexperienced human to classify. In the absence of additional domain knowledge, it would be difficult at best for any color based segmentation algorithm (let alone HNCuts) to distinguish these false positive errors from the true positives.

The claimed subject matter provides an unsupervised segmentation scheme termed Hierarchical Normalized Cuts (HNCuts). A strength of HNCuts is derived from the fact that it marries the best of both a novel Frequency Weighted Mean Shift clustering and the Normalized Cuts algorithm. By using the combination of these two algorithms, and by operating in the color space, HNCuts is able to handle large images efficiently. HNCuts was found to be 62% faster compared to a state of the art supervised classification scheme.

An advantage of HNCuts, apart from its efficiency and accuracy, is that it is not encumbered by the need for precisely annotated training data. The evaluation of HNCuts on 130 images corresponding to OCa TMAs, stained to identify a vascular biomarker, revealed that HNCuts performed better than two popular classifier and clustering techniques—Probabilistic Boosting Trees and k-means. Over 10 different runs of the HNCuts with different swatches, it was shown that the HNCut results had lower variance compared to PBT.

Additionally, when using the output from HNCuts to train PBT, the results were comparable to a supervised classifier trained directly with expert annotations. Hence, HNCuts is highly flexible, allowing for a lay person (non-expert) to specify a swatch comprising a few pixels representative of the target class. Thus HNCut is ideally suited for applications in digital histopathology and biomaker discovery where the need is for an image segmentation tool to rapidly identify different types of structures or classes of interest. While HNCut had a sensitivity of over 80% in identifying the vascular regions, the question of whether this level of accuracy is acceptable for predicting disease outcome can only be answered in a clinical trial setting. A quantitative metric derived from the HNCuts segmentation results may be able to be correlated with patient outcome. Thereby HNCuts results could be deemed to have acceptable accuracy. Such a validation is possible under the auspices of a clinical trial. Since HNCut can operate in the color space, and is thus highly efficient, the only limitation in the size of the image that can be analyzed by HNCut is the amount of computer memory available to read in the image data. The disclosed subject matter also brings into the picture exploring the applicability of HNCuts to other segmentation problems, including other color based segmentation problems.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

It will be understood that the embodiments described herein are merely exemplary and that a person skilled in the art may make many variations and modifications without departing from the spirit and scope of the disclosed subject matter. For instance, all such variations and modifications are intended to be included within the scope of the claimed subject matter as defined in the appended claims.

The invention claimed is:

1. A high-throughput method for quantifying staining of a biomarker in an original image of a pathology sample comprising the steps of:
   a. selecting a domain swatch of data based upon a user specified domain knowledge of data within the original image;
   b. clustering the data within the original image by conducting a frequency weighted mean shift of the data within the original image to convergence to form a hierarchical plurality of layers of mean shifted data images, each having a different data resolution to form a hierarchical data pyramid;
   c. segmenting the plurality of mean shifted data images to determine in each mean shifted data image within the hierarchical data pyramid data included within the swatch;
   d. mapping the data included within the swatch spatially back to the original image to create a final image; and
   e. storing the final image on a storage medium for further analysis.

2. The method of claim 1, wherein the pathology sample comprises an image of a tissue cylinder from within a tissue micro-array.

3. The method of claim 1, wherein the pathology sample comprises a tissue biopsy sample.

4. The method of claim 1, wherein the biomarker is a vascular biomarker.

5. The method of claim 1, wherein the biomarker is stained for indicating a disease condition.

6. The method of claim 1, wherein the domain swatch of data within the original image is selected from the group consisting of image color, intensity and texture.

7. The method of claim 1, wherein said segmentation step comprises a normalized cuts algorithm.

8. A high-throughput method for detecting regions of interest due to presence of a biomarker in an original image of a pathology sample comprising the steps of:
   a. selecting a domain swatch of data based upon a user specified domain knowledge of data within the original image;
   b. clustering the data within the original image by conducting a frequency weighted mean shift of the data within the original image to convergence to form a hierarchical plurality of layers of mean shifted data images, each having a different data resolution to form a hierarchical data pyramid;
   c. segmenting the plurality of mean shifted data images to determine in each mean shifted data image within the hierarchical data pyramid data included within the swatch;
   d. mapping the data included within the swatch spatially back to the original image to create a final image;
   e. storing the final image on a storage medium for further analysis; and
   f. detecting regions of interest on the final image.

9. The method of claim 8, wherein the pathology sample comprises an image of a tissue cylinder from within a tissue micro-array.

10. The method of claim 8, wherein the pathology sample comprises a tissue biopsy sample.

11. The method of claim 8, wherein the biomarker is a vascular biomarker.

12. The method of claim 8, wherein the biomarker is stained for indicating a disease condition.

13. The method of claim 8, wherein the domain swatch of data within the original image is selected from the group consisting of image color, intensity and texture.

14. The method of claim 8, wherein said segmentation step is via the normalized cuts algorithm.

15. The method of claim 8, wherein the method of detection is a supervised classification algorithm such as decision trees, probabilistic boosting trees, support vector machines, or a combination thereof.

16. A high-throughput method for quantifying a feature in an image comprising the steps of:
   a. selecting a domain swatch of data based upon a user specified domain knowledge of data within the image;
   b. clustering the data within the image by conducting a frequency weighted mean shift of the data within the image to convergence to form a hierarchical plurality of layers of mean shifted data images, each having a different data resolution to form a hierarchical data pyramid;
   c. segmenting the plurality of mean shifted data images to determine in each mean shifted data image within the hierarchical data pyramid data included within the swatch;
   d. mapping the data included within the swatch spatially back to the image to create a final image; and
   e. storing the final image on a storage medium for further analysis.

17. The method of claim 16, wherein the image comprises an image of a tissue cylinder from within a tissue micro-array.

18. The method of claim 16, wherein the image comprises an image of a tissue biopsy sample.

19. The method of claim 16, wherein the domain swatch of data within the original image is selected from the group consisting of image color, intensity and texture.

20. The method of claim 16, wherein said segmentation step comprises a normalized cuts algorithm.

21. The method of claim 16, wherein the step of segmenting the plurality of mean shifted data images comprises segmenting the plurality of mean shifted data images to determine a color of interest in each mean shifted data image within the hierarchical data pyramid.

* * * * *

UNITED STATES PATENT AND TRADEMARK OFFICE
CERTIFICATE OF CORRECTION

PATENT NO. : 9,111,179 B2
APPLICATION NO. : 13/496627
DATED : August 18, 2015
INVENTOR(S) : Andrew Janowczyk et al.

It is certified that error appears in the above-identified patent and that said Letters Patent is hereby corrected as shown below:

In the specification,

In Column 5, line 36, the word "may" should be deleted and replaced with the word "many;"

In Column 12, equation 8 should be deleted and replaced with " $\sum_{i=1}^{M_k} W_{k,i} = N$ "

In Column 14, equation 13 should be deleted and replaced with "$(D-\Psi)\xi=\lambda D\xi$"; and In Column 17, line 4, the word "see" should be deleted and replaced with the word "seen."

Signed and Sealed this
Twelfth Day of April, 2016

Michelle K. Lee
*Director of the United States Patent and Trademark Office*